(12) United States Patent
Hikoyama

(10) Patent No.: US 11,009,153 B1
(45) Date of Patent: May 18, 2021

(54) ANGLE STRUT STRAP

(71) Applicant: Atsushi Hikoyama, Tokyo (JP)

(72) Inventor: Atsushi Hikoyama, Tokyo (JP)

( * ) Notice: Subject to any disclaimer, the term of this patent is extended or adjusted under 35 U.S.C. 154(b) by 0 days.

(21) Appl. No.: 16/876,126

(22) Filed: May 18, 2020

Related U.S. Application Data

(63) Continuation of application No. 29/714,735, filed on Nov. 25, 2019, and a continuation of application No. 29/714,733, filed on Nov. 25, 2019, and a continuation of application No. 29/713,589, filed on Nov. 18, 2019.

(51) Int. Cl.
*F16L 3/01* (2006.01)
*F16L 3/04* (2006.01)
*F16L 3/10* (2006.01)

(52) U.S. Cl.
CPC ................ *F16L 3/01* (2013.01); *F16L 3/04* (2013.01); *F16L 3/1008* (2013.01)

(58) Field of Classification Search
CPC ............. F16L 3/01; F16L 3/04; F16L 3/1008
USPC ...................... 248/65, 70, 72, 73, 74.1, 74.4
See application file for complete search history.

(56) References Cited

U.S. PATENT DOCUMENTS

| | | | | |
|---|---|---|---|---|
| 5,799,907 A | * | 9/1998 | Andronica | F16L 3/2431 248/62 |
| 5,984,243 A | * | 11/1999 | Pfaller | F16L 3/1066 248/74.1 |
| 6,494,415 B1 | * | 12/2002 | Roth | F16L 3/243 248/74.1 |
| 7,520,475 B2 | * | 4/2009 | Opperthauser | F16L 3/2431 248/71 |
| 7,591,442 B2 | * | 9/2009 | Dinh | F16L 3/1033 248/73 |
| 7,735,270 B2 | * | 6/2010 | Olle | F24F 13/0254 52/167.9 |
| 7,922,130 B2 | * | 4/2011 | Hawkins | F16L 3/243 248/74.2 |
| 7,992,829 B1 | * | 8/2011 | Baker | F16L 3/243 248/73 |
| 8,091,839 B2 | * | 1/2012 | Whipple | F16L 3/1033 248/67.7 |
| 8,181,916 B2 | * | 5/2012 | Azuma | F16L 3/127 248/68.1 |
| 8,226,052 B2 | * | 7/2012 | Hancock | F16L 3/243 248/74.4 |
| 8,322,661 B2 | * | 12/2012 | Oh | F16L 3/14 248/62 |
| 2006/0027715 A1 | * | 2/2006 | Dinh | F16L 3/137 248/65 |
| 2012/0119037 A1 | * | 5/2012 | Azuma | F16L 3/04 248/65 |
| 2014/0097304 A1 | * | 4/2014 | Mastro | F16L 3/243 248/73 |

\* cited by examiner

*Primary Examiner* — Muhammad Ijaz
(74) *Attorney, Agent, or Firm* — Tracy M Heims; Apex Juris, pllc.

(57) ABSTRACT

A strut strap having a first leg with a first angled end, a shaped middle section; a second end having a middle section and feet at opposing ends where each of the feet are angled away from the first end middle section in opposite directions; a second leg having a first angled end and a shaped middle section; and a second end having a middle section and feet at opposing ends where each of the feet are angled away from the second end middle section in opposite directions.

20 Claims, 29 Drawing Sheets

US 11,009,153 B1

ANGLE STRUT STRAP

BACKGROUND OF THE INVENTION

Field of the Invention

This invention relates to a strut strap that is designed and used to secure a pipe to a pipe support or to a U-shaped strut channel. More particularly, the invention relates to an easily usable connecting apparatus with a straight top section and angled legs that is designed to simplify affixing the connecting apparatus to the pipe support or to the U shaped strut beam or U-Channel and to then simplify affixing the pipe to the pipe support and even more particularly in a second embodiment to a strut strap with an angled top member combined with angled legs that is designed to simplify affixing the connecting apparatus to the pipe support or to the U-Channel and to then simplify affixing the pipe to the pipe support.

Description of the Prior Art

The present invention deals with products in the field of construction, and specifically in the area of configuring, securing and affixing pipe to a support or a channel such as U-shaped Unistrut or strut beam. The product is not limited to any one application and thus can be used for affixing pipe to supports, channel, U-Channel or unistrut.

Strut straps are commonly known in the industry by a variety of names, including strut straps, strut clamps, pipe clamps or conduit clamps. For ease of understanding the term strut strap will be used throughout. These strut straps are typically used in conjunction with the strut beam, U-Strut, U-Channel or Uni-strut. These U channels are also known by a number of names in the industry but for simplicity sake the term U-Channel will be used herein to define this U-shaped beam. These strut straps are used to strap conduit and pipe perpendicular to the IJ-Channel. These straps have historically not changed much in shape or configuration. The current invention desires to change this standard shape to provide a strut strap that uses less material and is therefore more environmentally friendly, that is just as strong as a standard strut strap and that has a configuration that provides more usefulness, easier installation and more utility.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

OBJECTS AND SUMMARY OF THE INVENTION

In view of the foregoing it is an object of the present invention to provide an angle legged pipe support strut strap that will securely fasten a pipe to the pipe support block or to U-Channel, that is easily, quickly and efficiently installable and removeable. Ideally this angled strut strap is made entirely of metal and this metal can be of any variety including but not limited to galvanized, stainless steel, dipped metals including dipping in Posmac, a type of anti-corrosion coating, or any other type of metal.

It is another object of the present invention to provide this angle legged strut strap that is easily installable on pipe supports, Unistrut or any other standard U-Channel. The angle legged strut strap is easily installable due to the unique leg design and configuration that allows installation without having to separate two halves of the strap.

It is still another object of the present invention to provide the angle legged strut strap that is easily removeable, again due to the unique angled leg design.

The present invention achieves these objects and other objects that become evident from the following detailed description of the preferred embodiments of the invention by providing the angle legged strut strap that is easily mountable to a pipe support, to Unistrut or U-channel and to a pipe or conduit.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the inventive subject matter.

DETAILED DESCRIPTION OF THE EMBODIMENTS

Figure 1A:
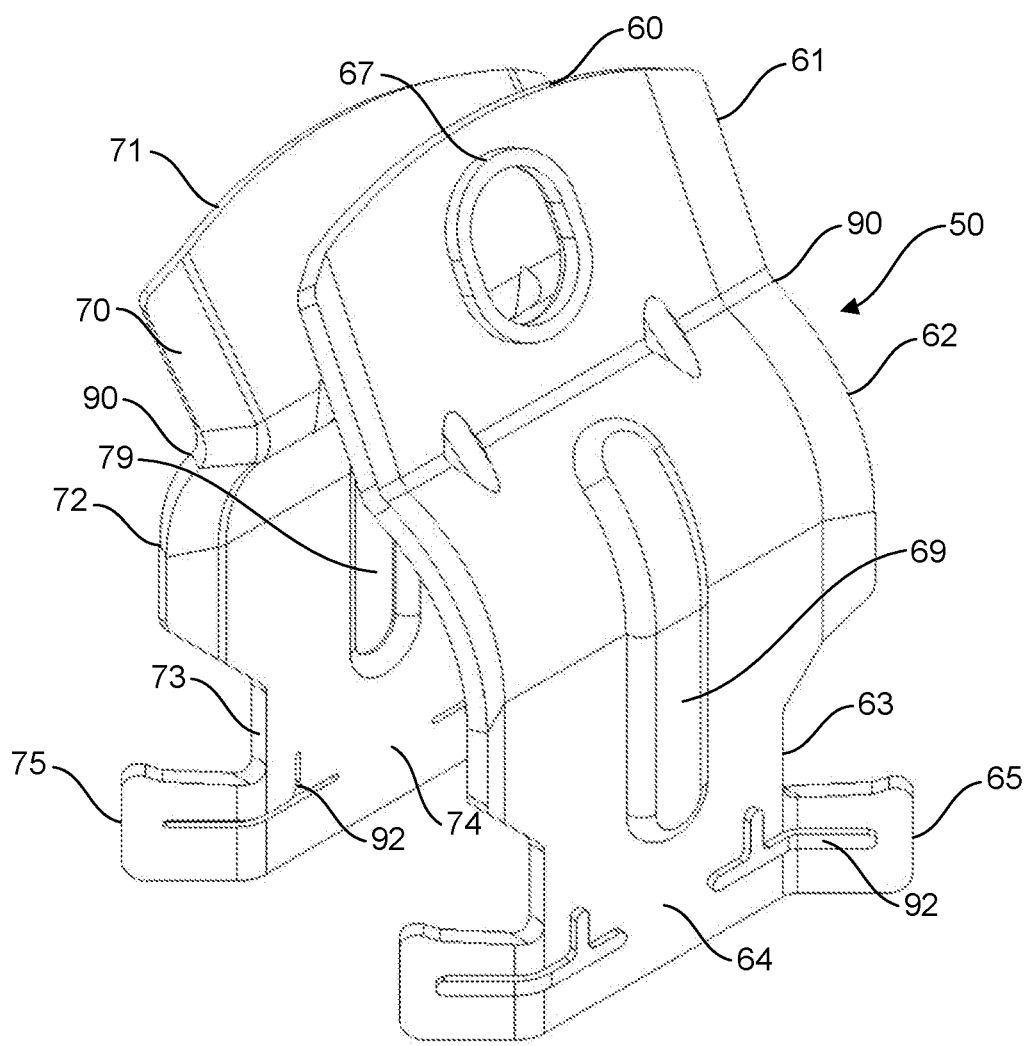
FIG. 1A is an elevated view of a short, angled top, angled feet strut strap with one rib.
Figure 1B:
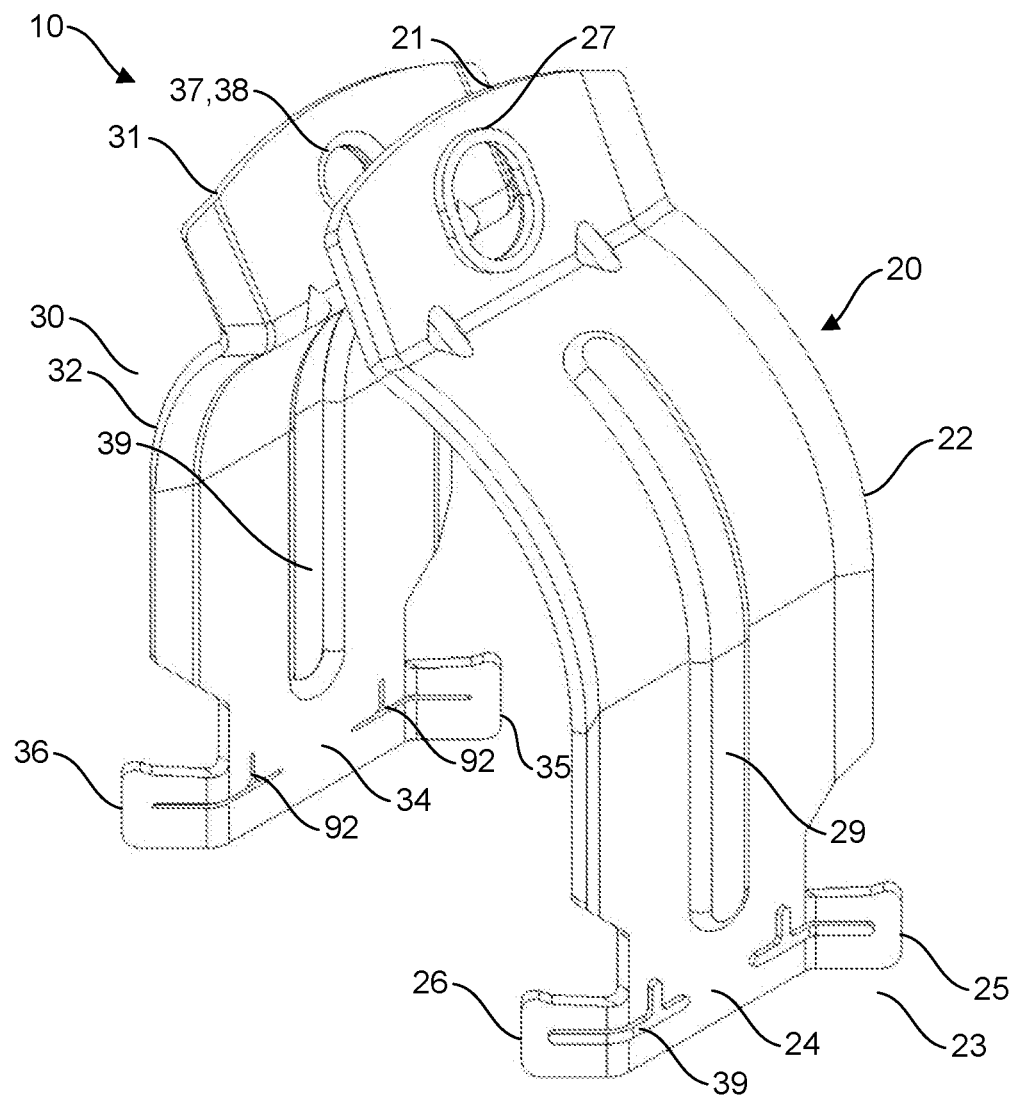
FIG. 1B is an elevated view of a long, angled top, angled feet strut strap with one rib.
Figure 1C:
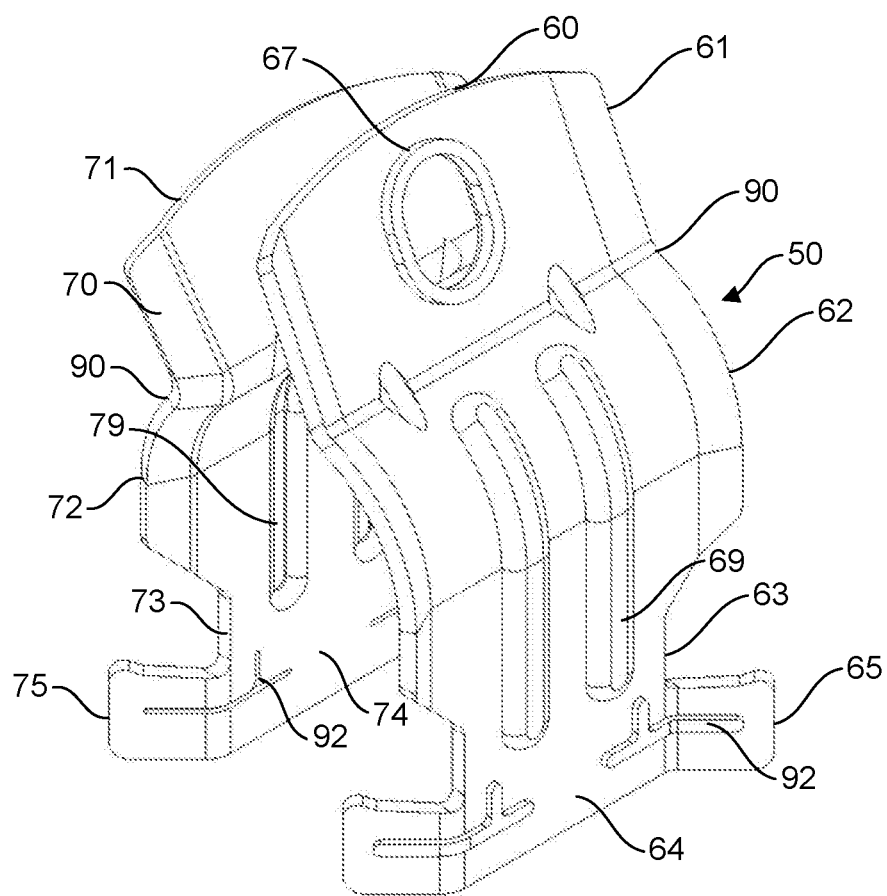
FIG. 1C is an elevated view of the short angled top, angled feet strut strap with two ribs.
Figure 1D:
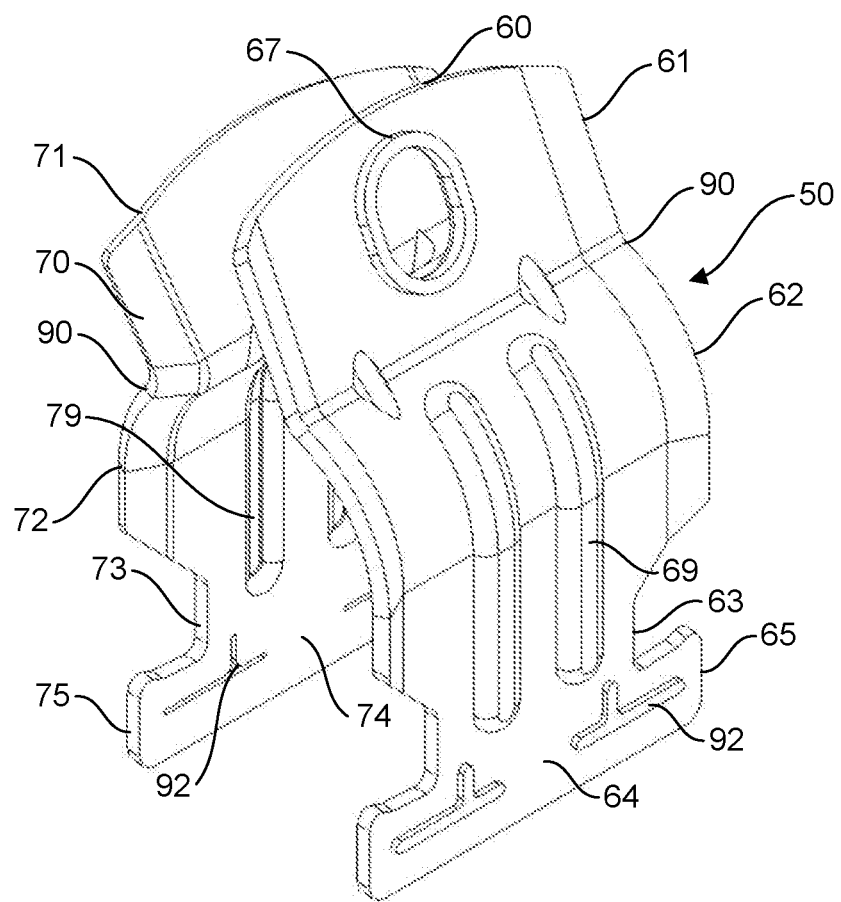
FIG. 1D is an elevated view of the short, angled top, straight feet strut strap with two ribs.

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, various examples of strut straps are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature or example.

The invention will now be described in detail with reference to the attached drawings. As described above in the summary there is a need for a strut strap that is easily installable and removeable. Currently strut straps are typically two identical matching pieces of stamped metal that form a first strap and a second strap that match and work with one another. Each of these straps has an end that is a hooked bottom portion used to connect to opposing walls of a U-channel, or Unistrut. Each of the first strap and second strap have a portion that is designed to securely engage and connect to or into a lip on an inside of the U-Channel. Each of these straps then have a middle portion that engages with opposing sides and top of a pipe. Next, each leg has another end wherein each leg has a through hole formed therein. In order to secure one leg to the other and to secure the pipe therebetween a bolt is inserted through one of the through holes and is then inserted through the matching through hole on the second leg. After the bolt is inserted through both of the through holes a nut is affixed to a screw end formed on an end of the bolt. The nut is then tightened down on the threaded bolt end so as to firmly and securely fasten the pipe between the legs and to the U-Channel or pipe support.

This form of strut strap has existed in the industry for a very long time and obviously works but it does have many drawbacks. First, it requires many parts to install, including two legs, a bolt and a nut. Next, it is difficult to install as it requires that the legs be taken apart prior to installation. To install it requires fitting each hooked end into the U-Channel, then matching the legs, followed by inserting the bolt through the through holes and finally having to secure the nut to the threaded end. Doing this typically requires at least two tools. One to hold one end of the bolt to prevent it from rotating and then another tool to tighten the nut to the threaded bolt end. This is cumbersome, difficult and time consuming and is one of the primary reasons for the present invention FIGS. 1E, 2E, 8D and 9D are views having two ribs down the side of a strut strap where the strut strap has a straight top and angled feet. In this embodiment there are two ribs down the side rather than a single rib, as shown in FIGS. 1E, 2E, 8D and 9D. These Figs. show two embodiments of the invention, that is, a single side rib and a double side rib. All of these images show the straight top, and then either the single rib or pair of ribs with angled feet. Clearly shown in all of these Figures are a pair of strut straps 10 having a first leg 20 with a first end 21, a flared middle section 22, then a second end 23 having a middle section 24 and feet 25, 26 at opposing ends where each of the feet 25, 26 are angled away from the second end middle section 24; a second leg 30 having a first end 31, a flared middle section 32, and a second end 33 having a middle section 34 and feet 35, 36 at opposing ends where each of the feet 35, 36 are angled away from the second end middle section 34. This is the simplest embodiment of the present invention. In this embodiment the legs are basically mirror images of each other. The first ends 21, 31 of each of said legs 20, 30 meet at a top of the strut strap 10 and can be connectable one to another in a variety of ways. There is a means to connect one to the other at the first ends 21, 31. One method is to have the ends permanently affixed one to another by weld, glue, adhesive or some other means. This is not very versatile and limits the usefulness of the strut straps 10.

Another means has the first leg first end 21 and the second leg first end 31 wherein each leg end 21, 31 has a hole 27, 37 in each leg therethrough and the means to connect the one leg to the other leg is a threaded bolt 40 that is insertable through both of the holes 27, 37 and further there is a nut that is fastenable to the threaded bolt 40 to secure the first leg 20 to the second leg 30. This means works but is not ideal because it requires a user to use multiple tools to connect the bolt 40. Once the bolt 40 is inserted through the first hole 27 the nut must be installed onto the bolt 40. This requires holding a first end of the bolt 40 so that it does not move or rotate while installing the nut to a second end of the bolt 40. Either the bolt first end or second end must be held while tightening the nut to the bolt. This requires the user to use both hands to secure the legs 21, 31 one to the other. This is inefficient and sometime difficult.

Figure 8A:
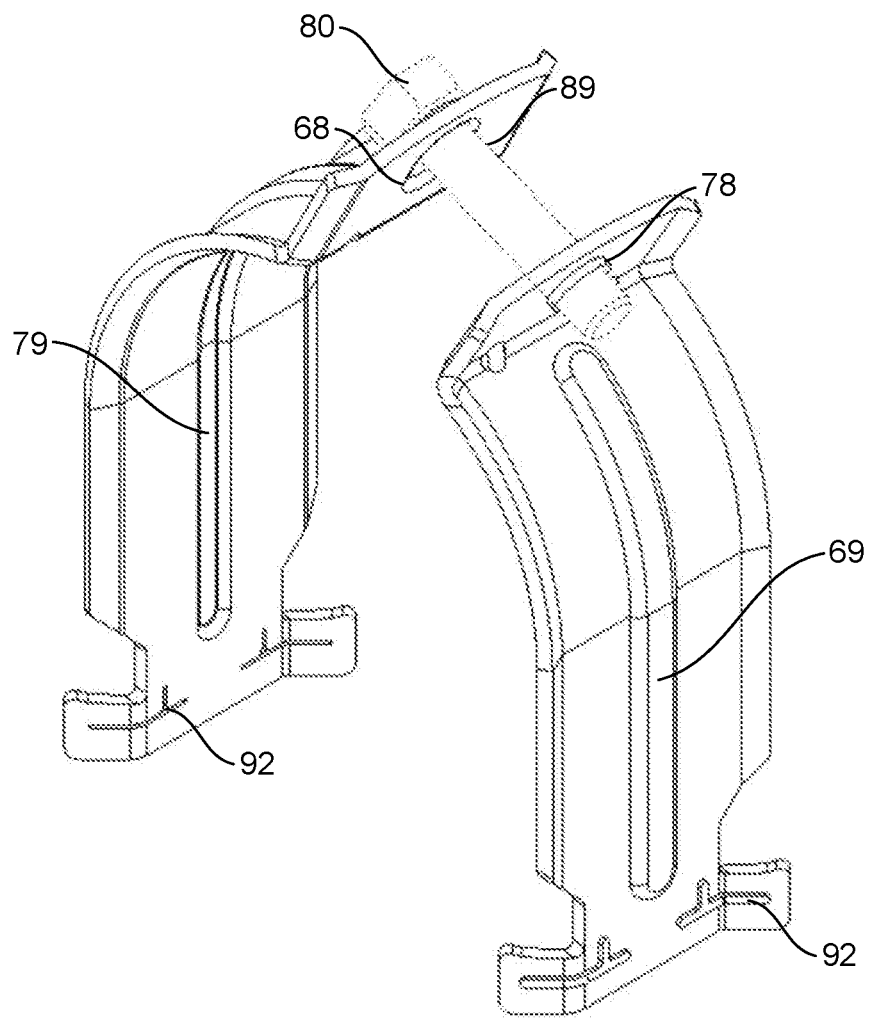
FIG. 8A is an elevated view of the long, angle legged strut strap with one rib and angled feet and the attachment apparatus installed.
Figure 8B:
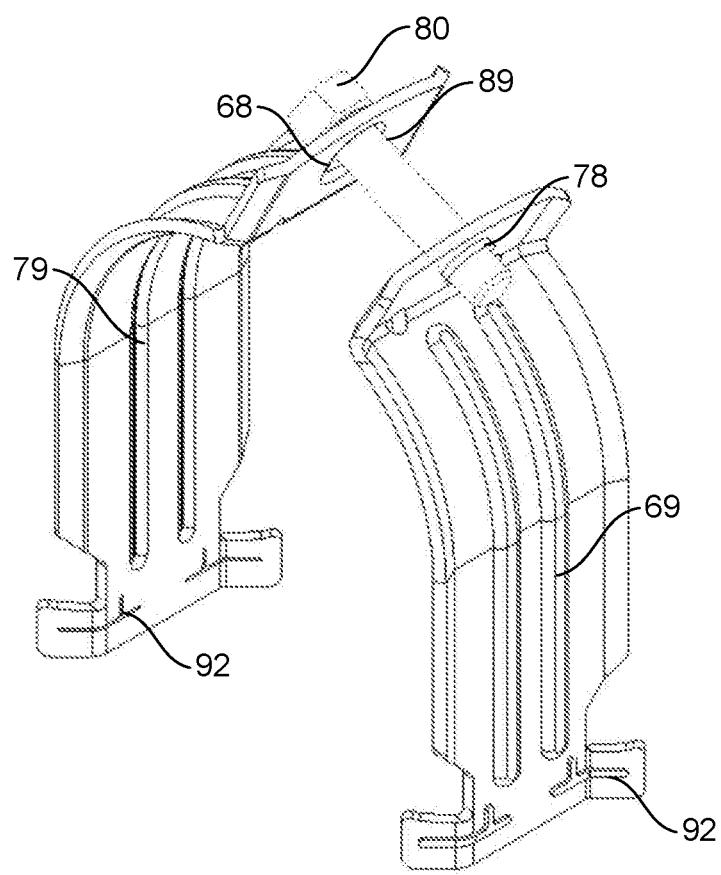
FIG. 8B is an elevated side view of the long, angle legged strut strap with two ribs and angled feet and the attachment apparatus installed.
Figure 8C:
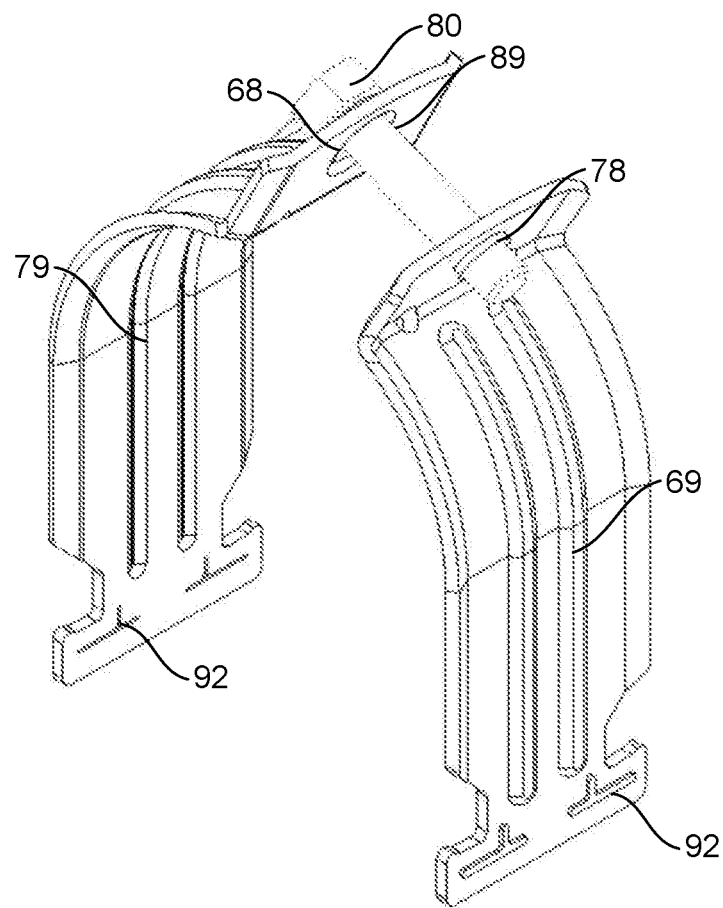
FIG. 8C is an elevated side view of the long, angle legged strut strap with two ribs, straight feet and the attachment apparatus installed.
Figure 8D:
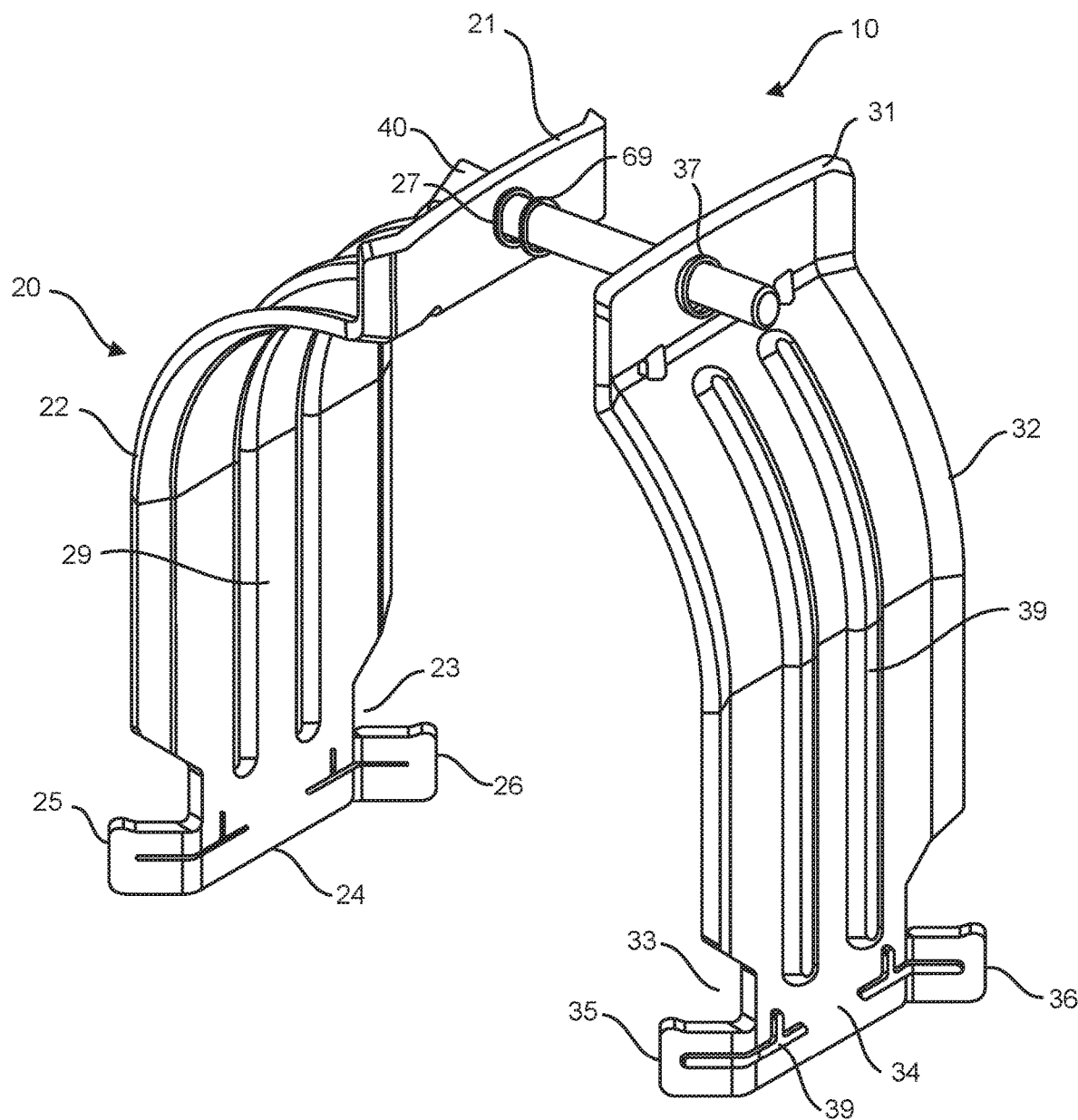
FIG. 8D is an elevated view of the long, straight top, angle legged strut strap with two ribs.
Figure 9A:
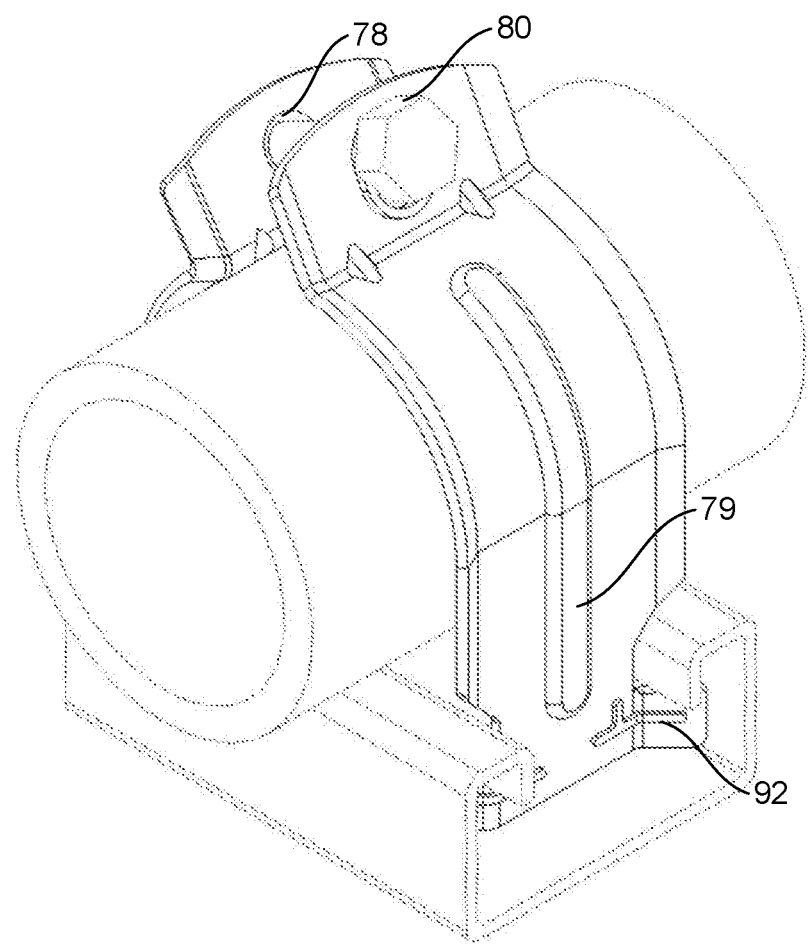
FIG. 9A is an elevated view of the long, angled top, angled feet strut strap with one rib, the attachment apparatus installed, the pipe installed therebetween and all installed on the U-channel.
Figure 9B:
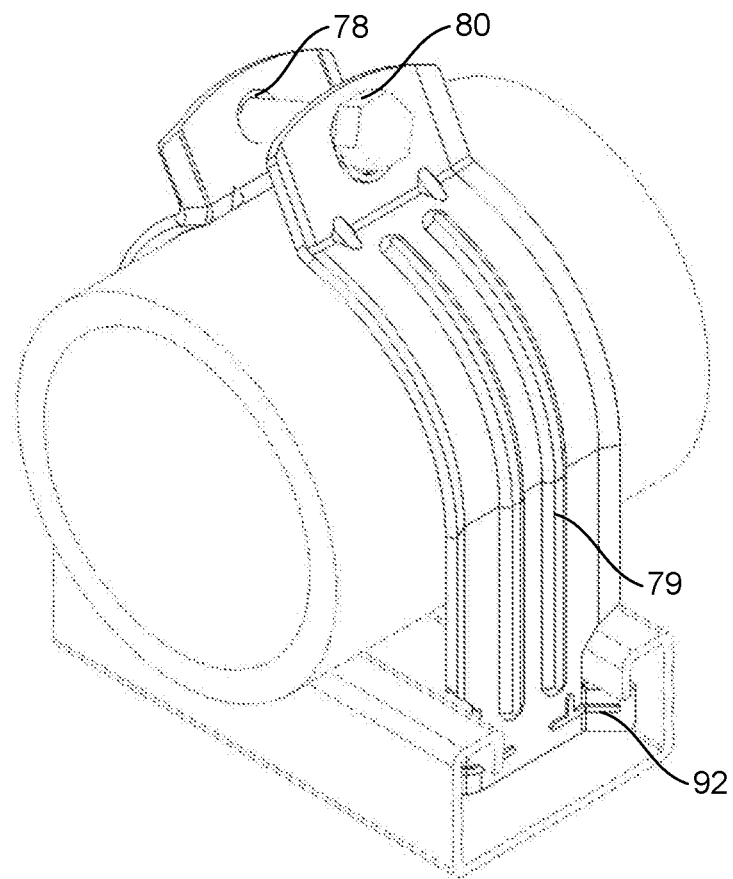
FIG. 9B is an elevated view of the long, angled top, angled feet strut strap with two ribs, the attachment apparatus installed, the pipe installed therebetween and all installed on the U-channel.
Figure 9C:
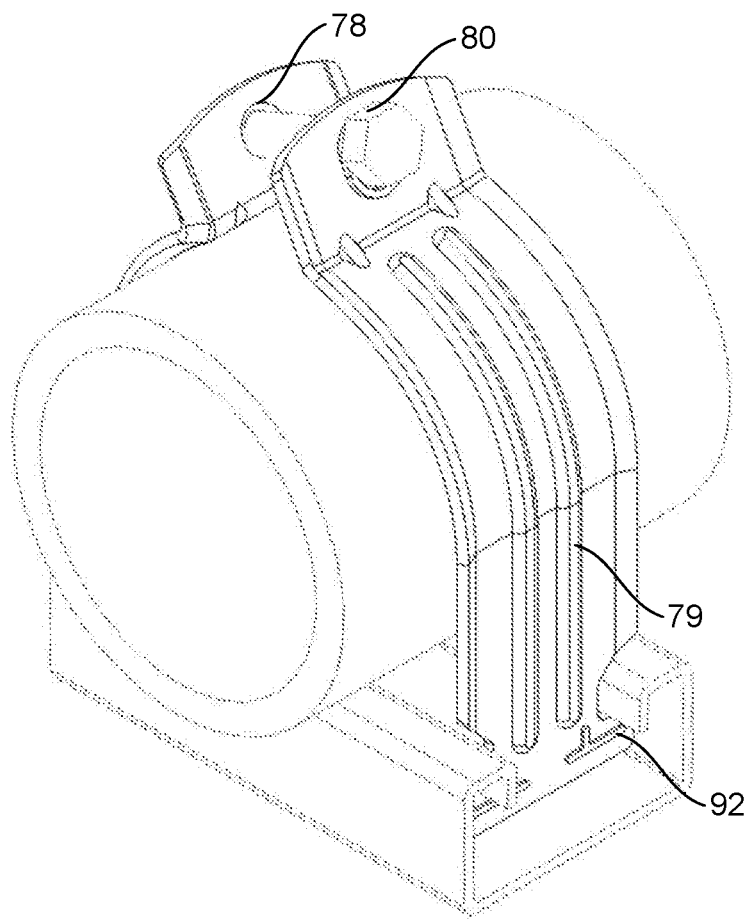
FIG. 9C is an elevated view of the long, angled top, straight feet strut strap with two ribs, the attachment apparatus installed, the pipe installed therebetween and all installed on the U-channel.
Figure 9D:
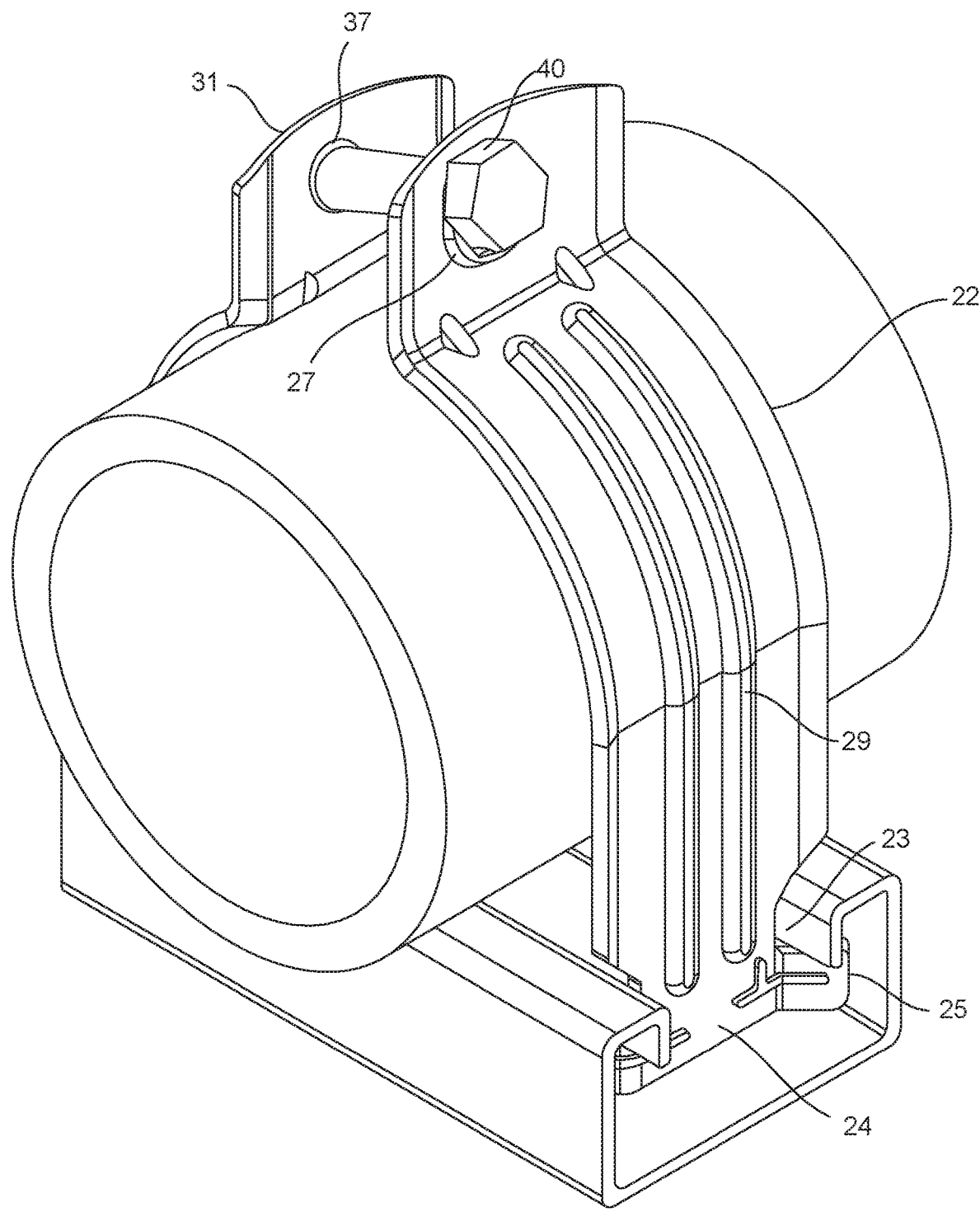
FIG. 9D is an elevated view of the long, straight top, angle feet strut strap with two ribs.

A better option is shown in FIGS. 8D and 9D as another embodiment. In this embodiment the strut strap's first leg first end 21 has a through hole 27 but the second leg first end 31 has a threaded hole 38 and the means to connect the one leg to the other leg is a bolt 40 with an end that matches the threaded hole 38 whereby the bolt 40 is insertable through the through hole 27 and is then securably screwable into the threaded hole 38 thereby connecting the legs one to the other. This is much easier and requires less time when connecting the legs together. In fact, in testing it has been shown that it is almost ten times faster using this method.

In this embodiment the strut strap's first leg first end 21 has the through hole 27 and the through hole may cause some problems. It is also possible to have a keeper washer 89 attached to the bolt. This keeper washer 89 is generally a plastic washer, larger in shape than the through hole 27, that is installed over the bolt 40 after the bolt 40 is inserted through the through hole 27 and the keeper washer 89 works to keep the bolt 40 from falling back through the through hole 27. Because the hole 27 is not threaded it is possible for the bolt 40 to easily fall out of the hole 27, thus creating a possibility that the bolt 40 gets dropped and lost by the user. This is prevented through use of the keeper washer 89 as it holds the bolt 40 in place during installation.

Figure 1E:
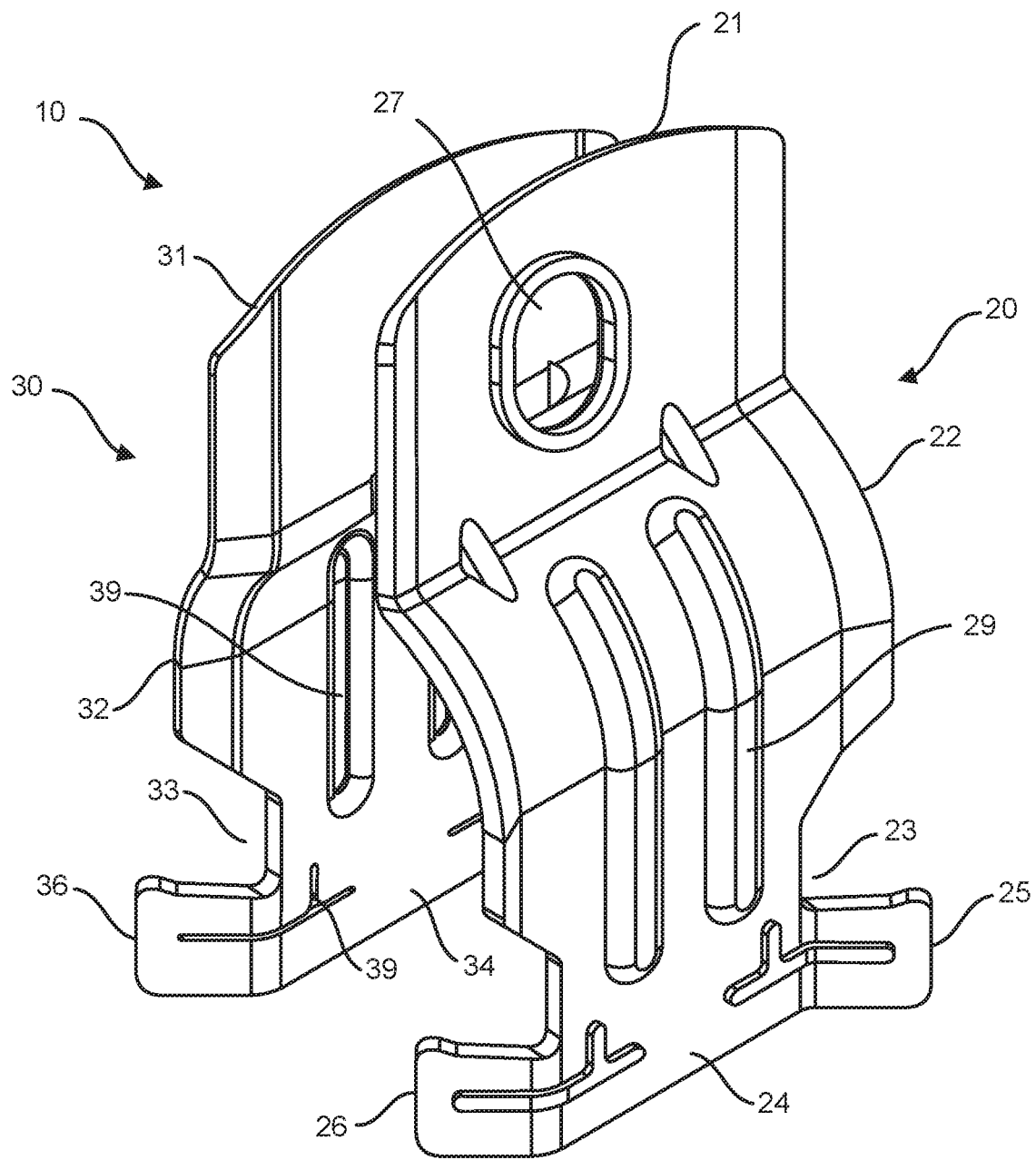
FIG. 1E is an elevated view of the short, straight top, angled feet strut strap with two ribs.
Figure 2A:
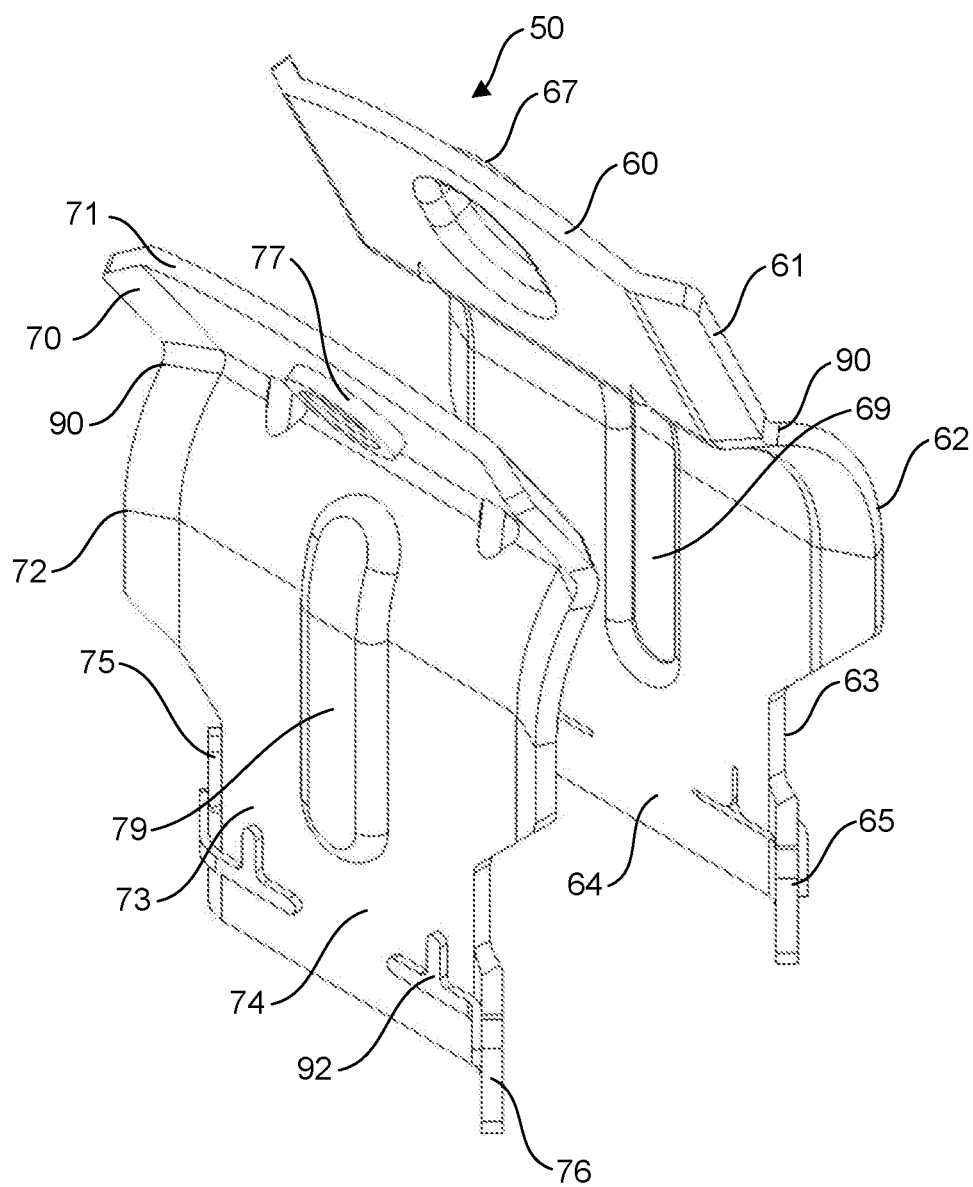
FIG. 2A is an elevated view of the short, angled top, angle legged strut strap with one rib from the opposite side.
Figure 2B:
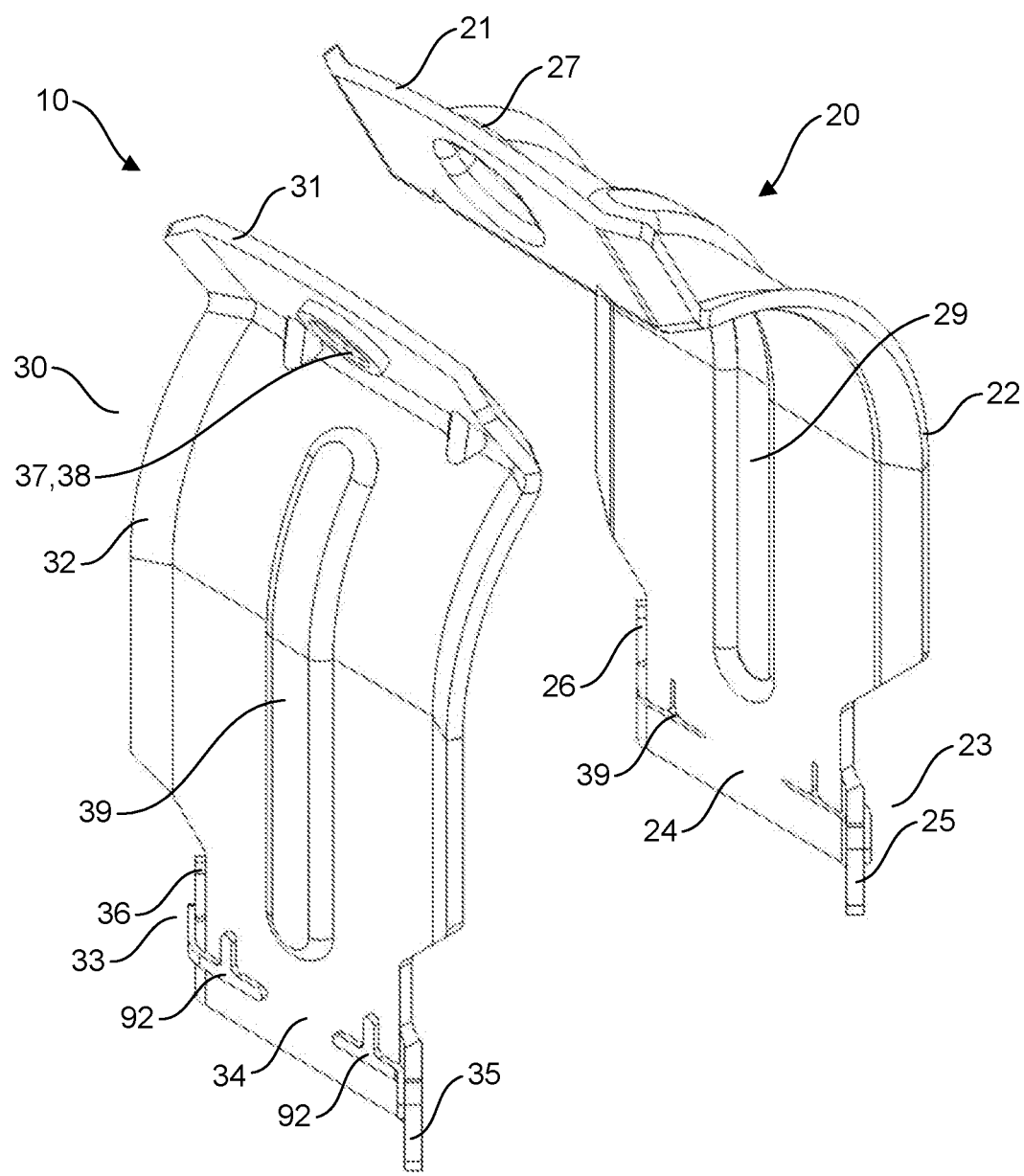
FIG. 2B is an elevated view of the long, angled top, angle legged strut strap with one rib from the opposite side.
Figure 2C:
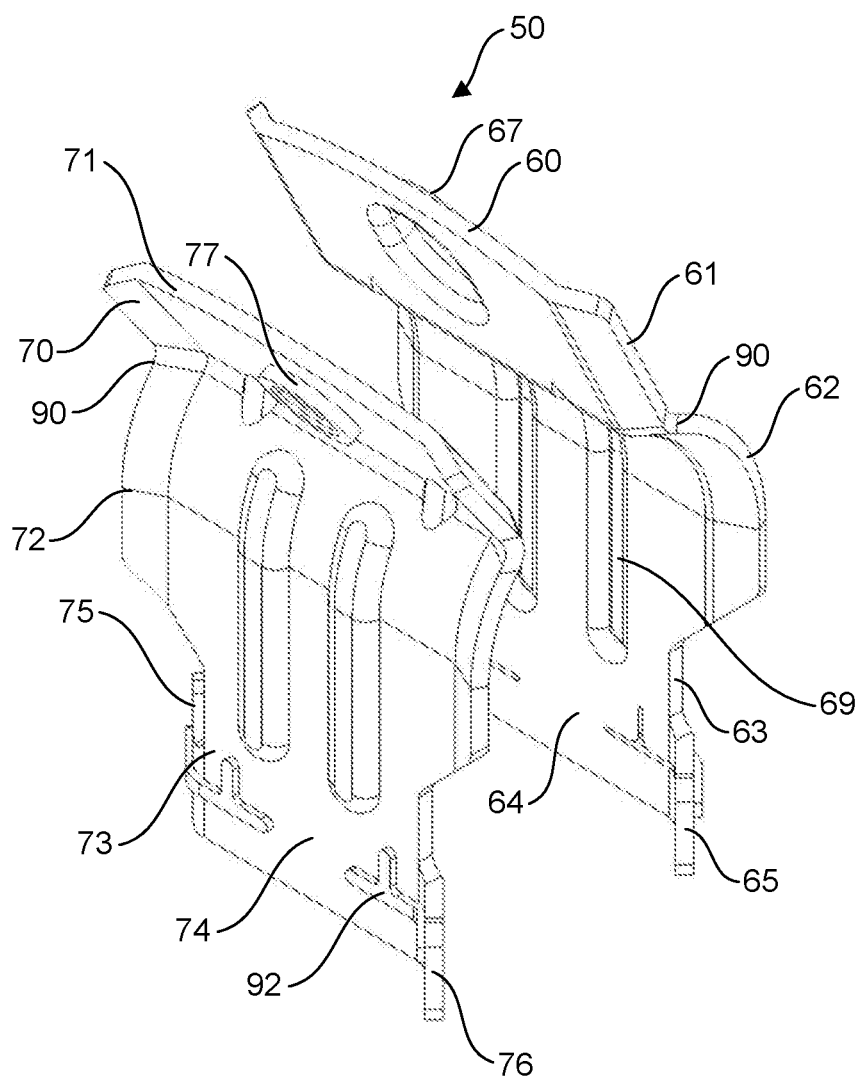
FIG. 2C is an elevated view of the long, angled top, angled feet strut strap with two ribs from the opposite side.
Figure 2D:
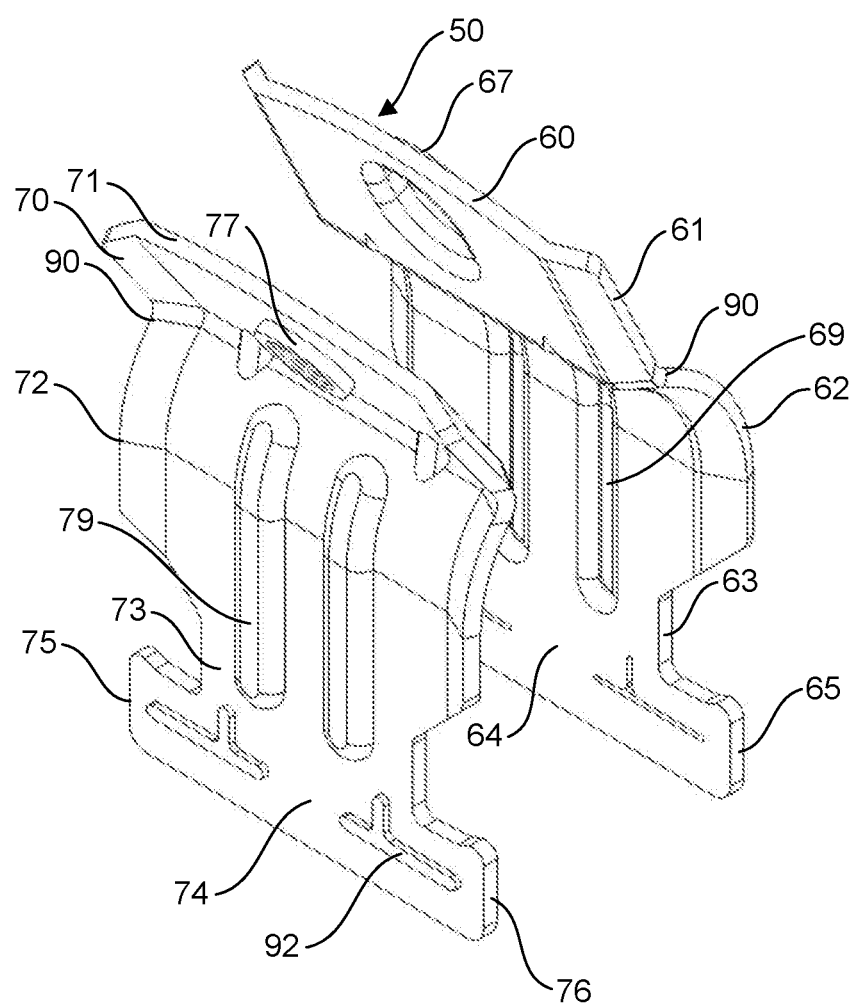
FIG. 2D is an elevated view of the short, angled top, straight feet strut strap with two ribs.
Figure 2E:
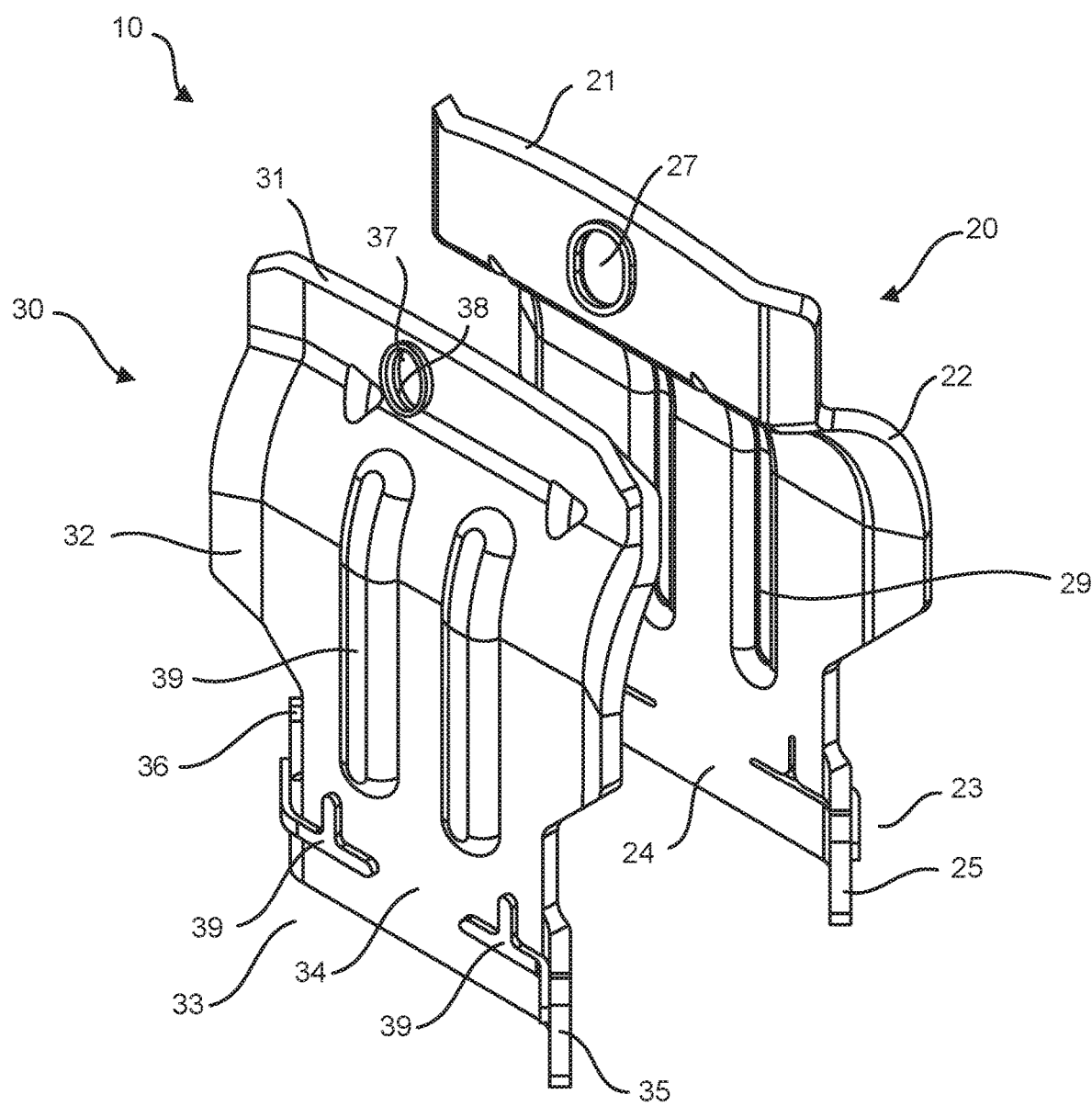
FIG. 2E is an elevated view of the short, straight top, angle legged strut strap with two ribs.
Figure 3A:
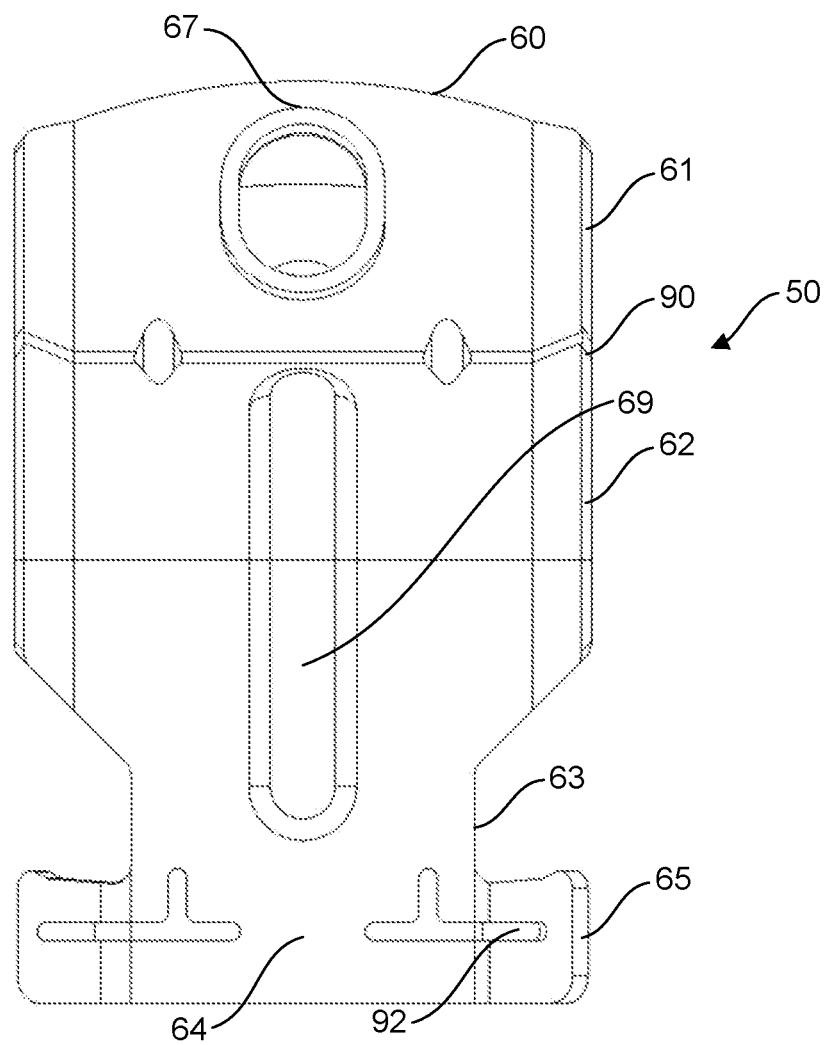
FIG. 3A is a side view of the short, angle legged strut strap with one rib and angled feet.
Figure 3B:
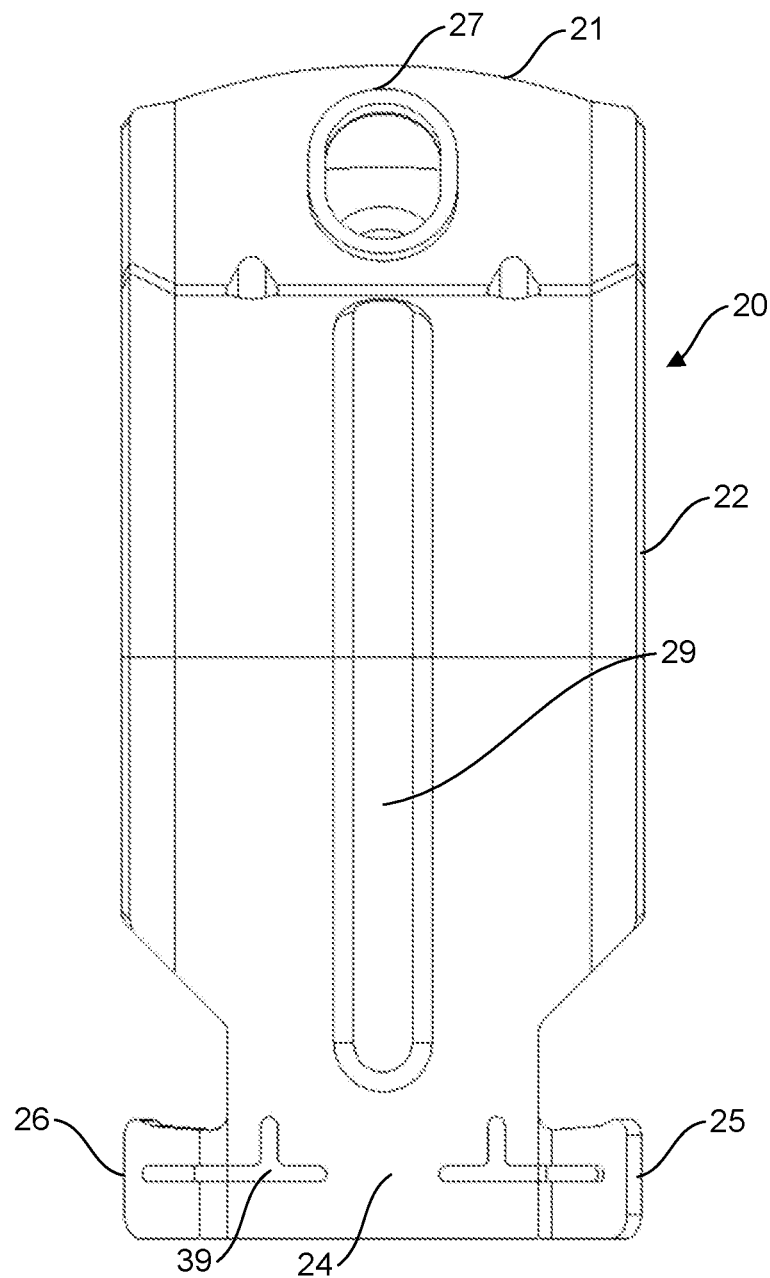
FIG. 3B is a side view of the long, angle legged strut strap with one rib and angled feet.
Figure 3C:
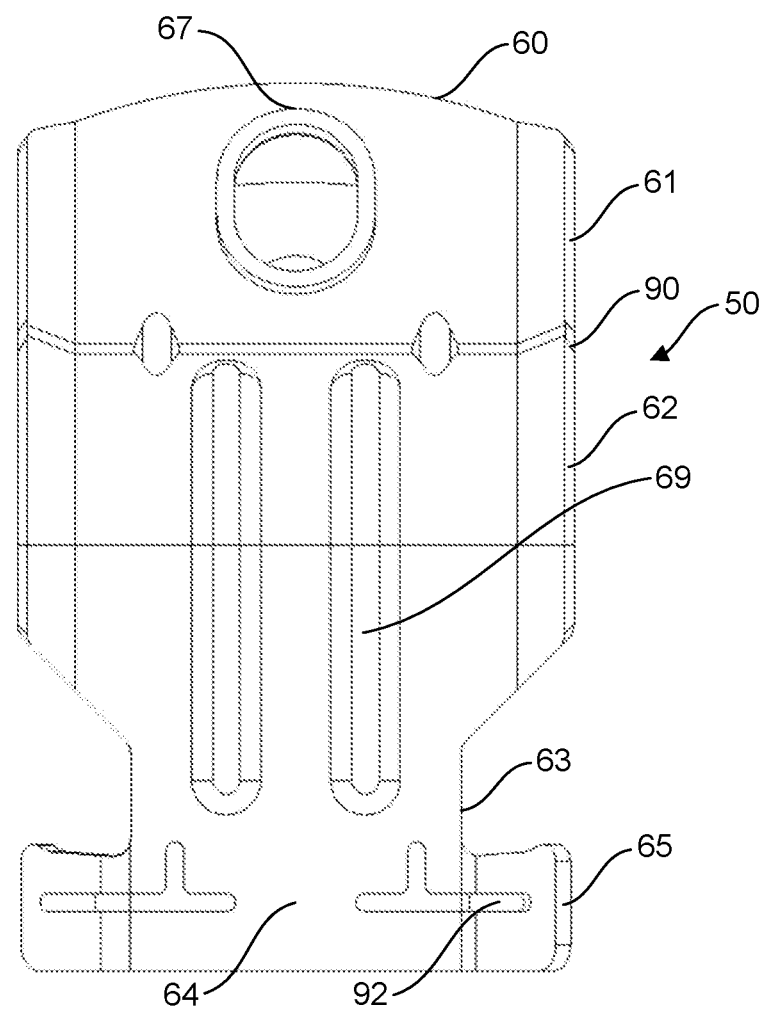
FIG. 3C is a side view of the short, angle legged strut strap with two ribs and angled feet.
Figure 3D:
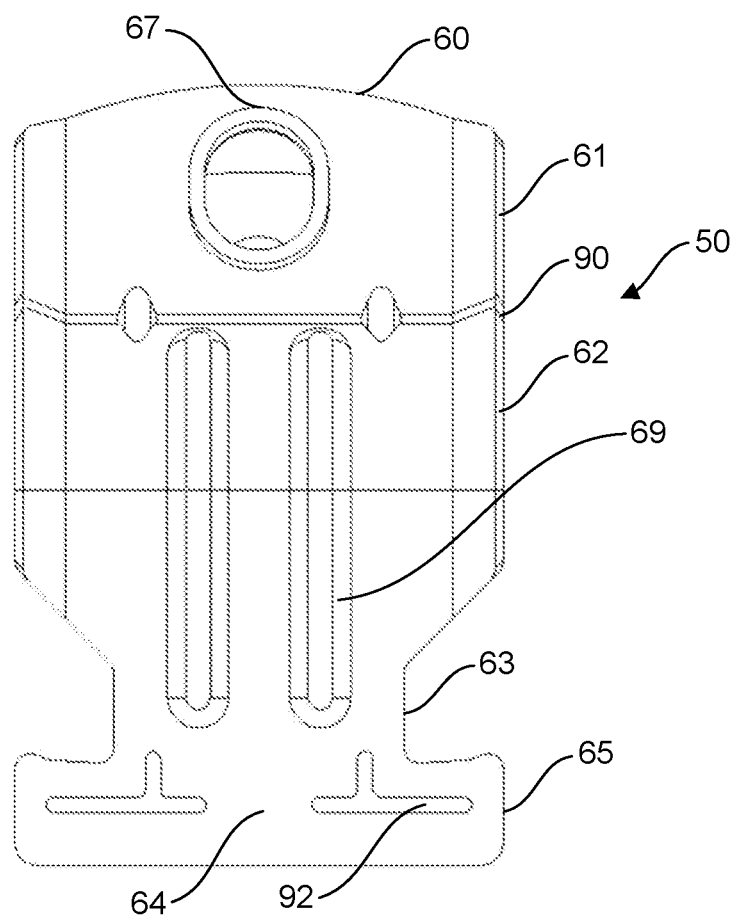
FIG. 3D is a side view of the short, angle legged strut strap with two ribs and straight feet.
Figure 4A:
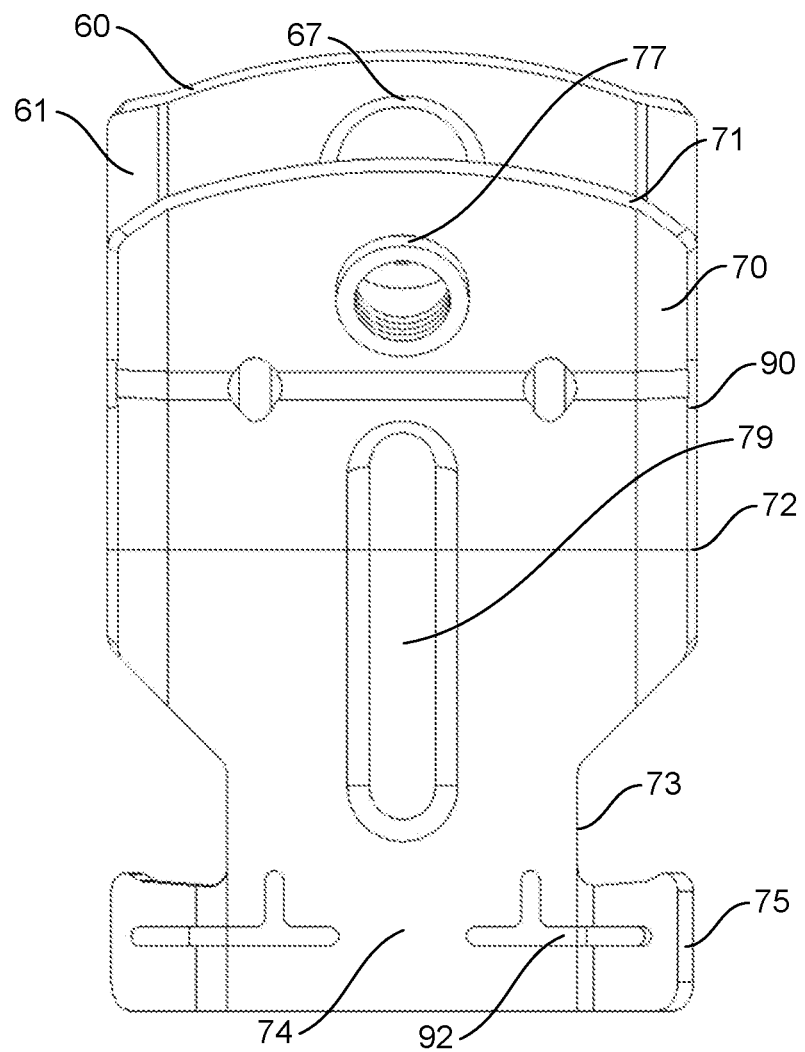
FIG. 4A is an opposite side view of the short, angle legged strut strap with one rib and angled feet.
Figure 4B:
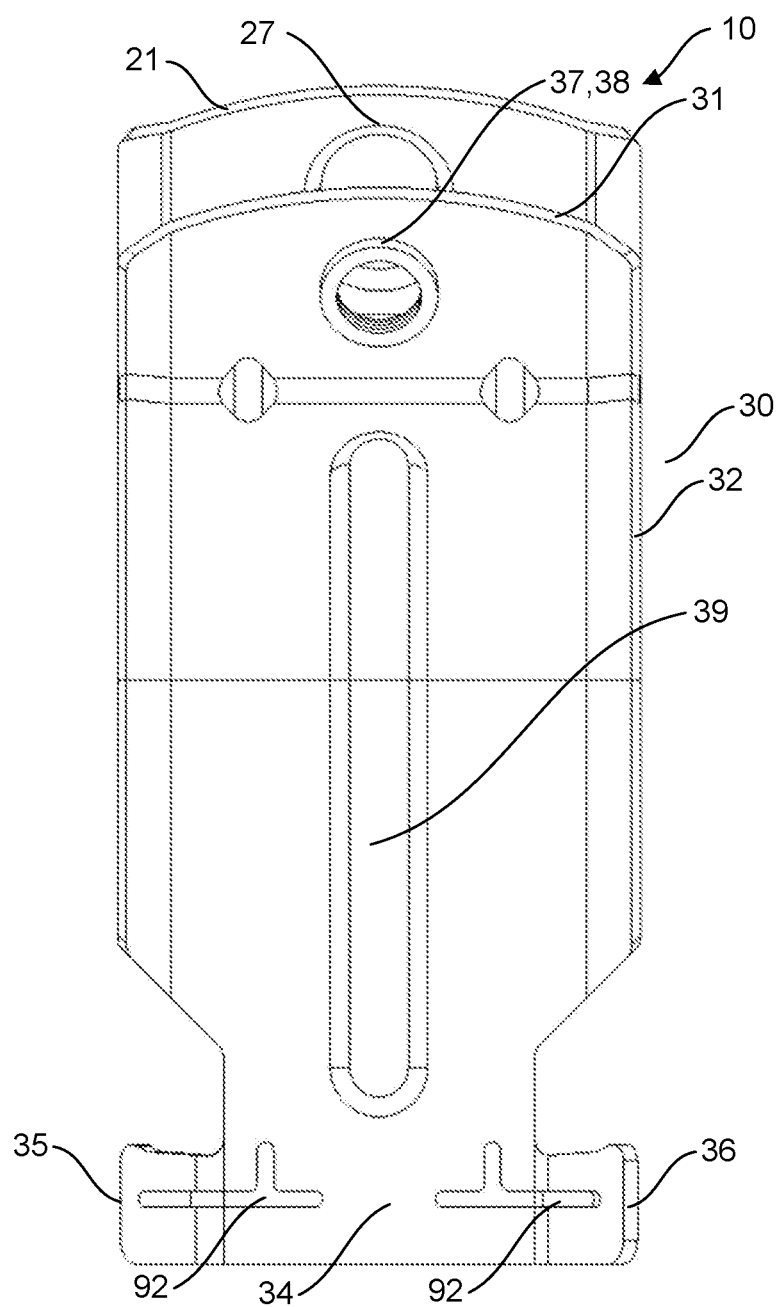
FIG. 4B is an opposite side view of the long, angle legged strut strap with one rib and angled feet.
Figure 4C:
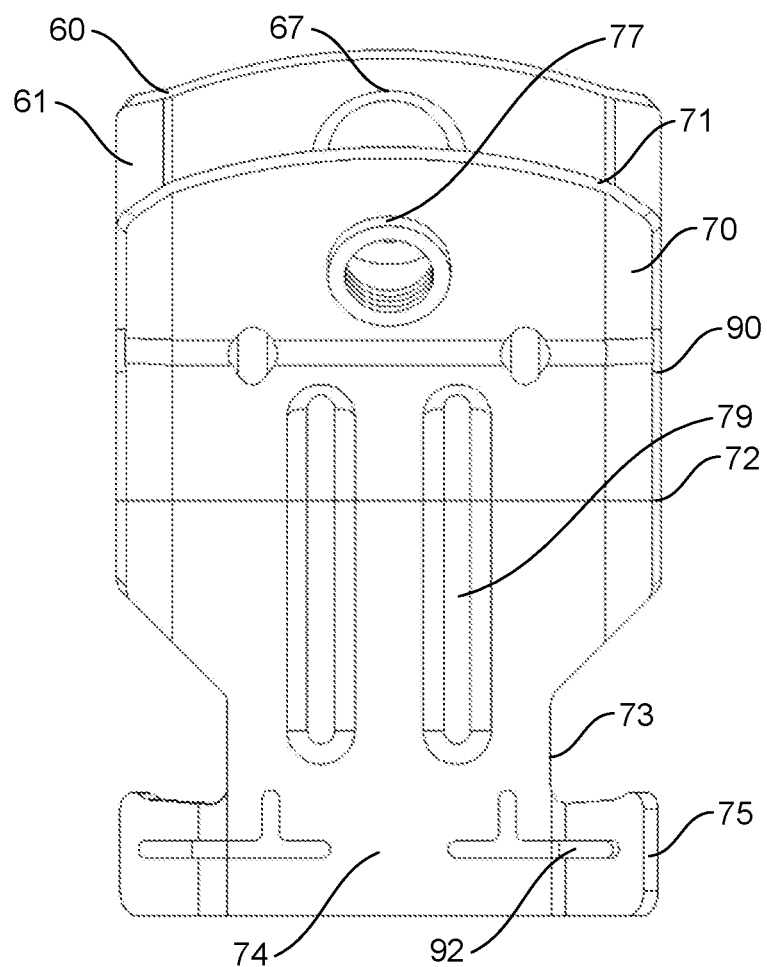
FIG. 4C is an opposite side view of the short, angle legged strut strap with two ribs and angled feet.
Figure 4D:
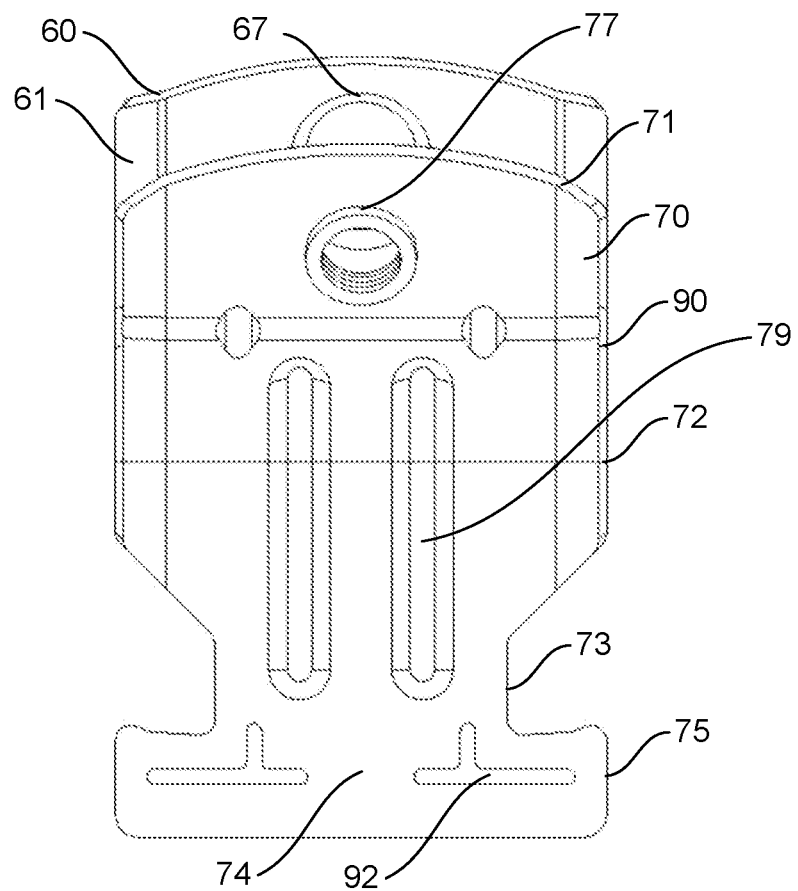
FIG. 4D is an opposite side view of the short, angle legged strut strap with two ribs and straight feet.
Figure 5:
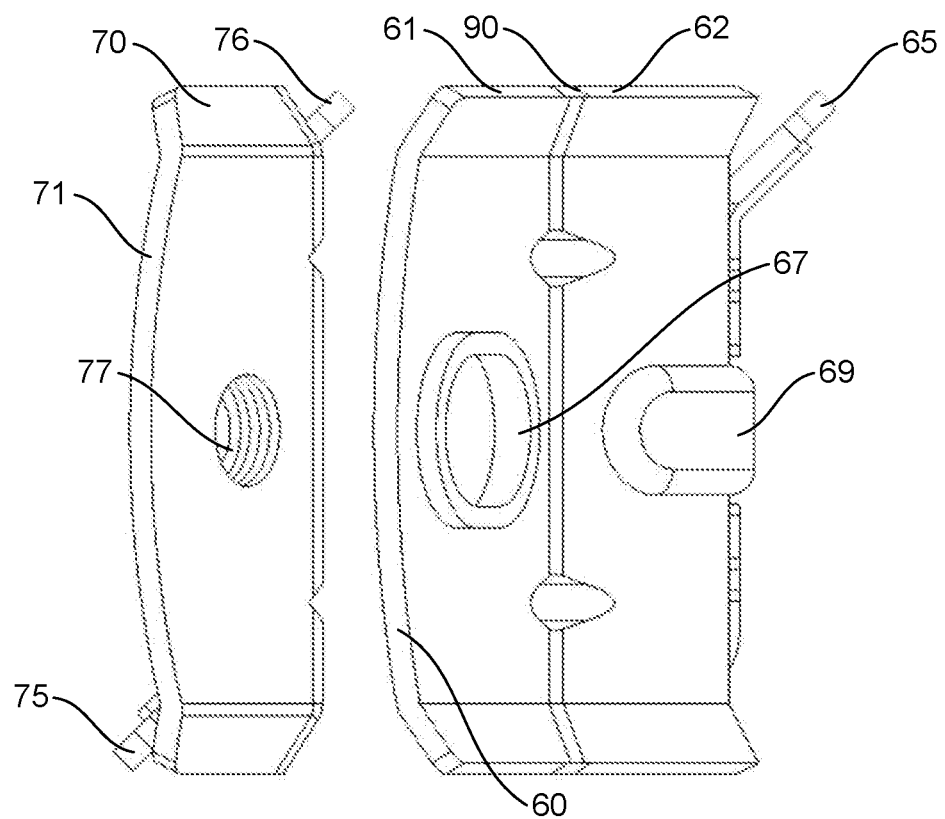
FIG. 5 is a top view of the short, angle legged strut strap with one rib and angled feet.
Figure 6:
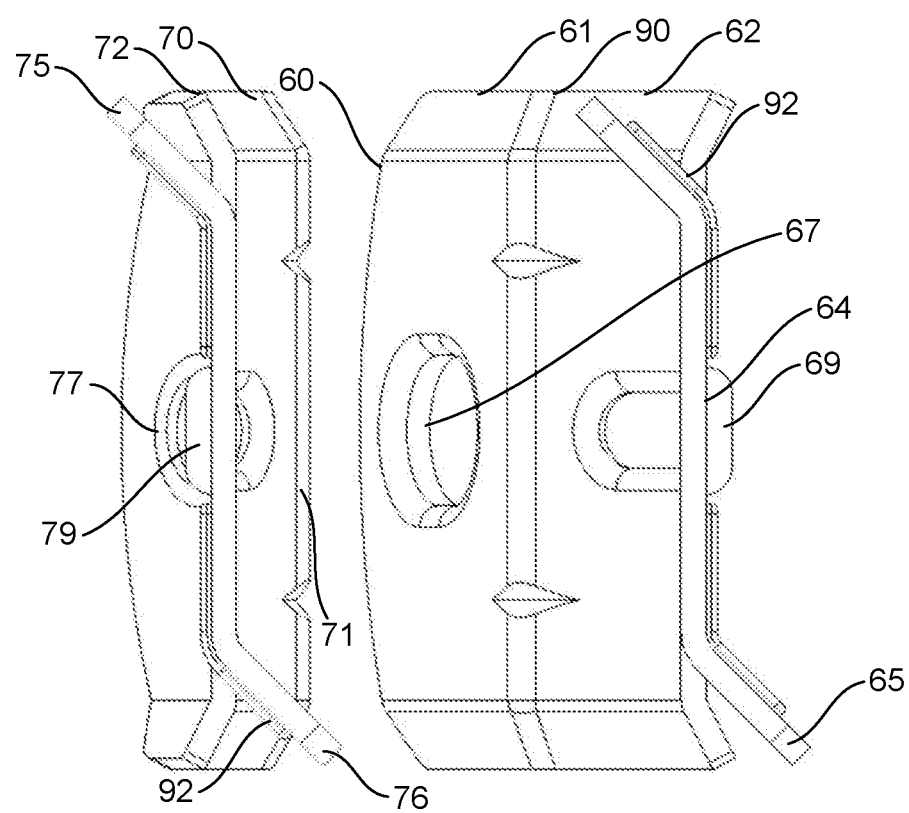
FIG. 6 is a bottom view of the short, angle legged strut strap with one rib and angled feet.
Figure 7:
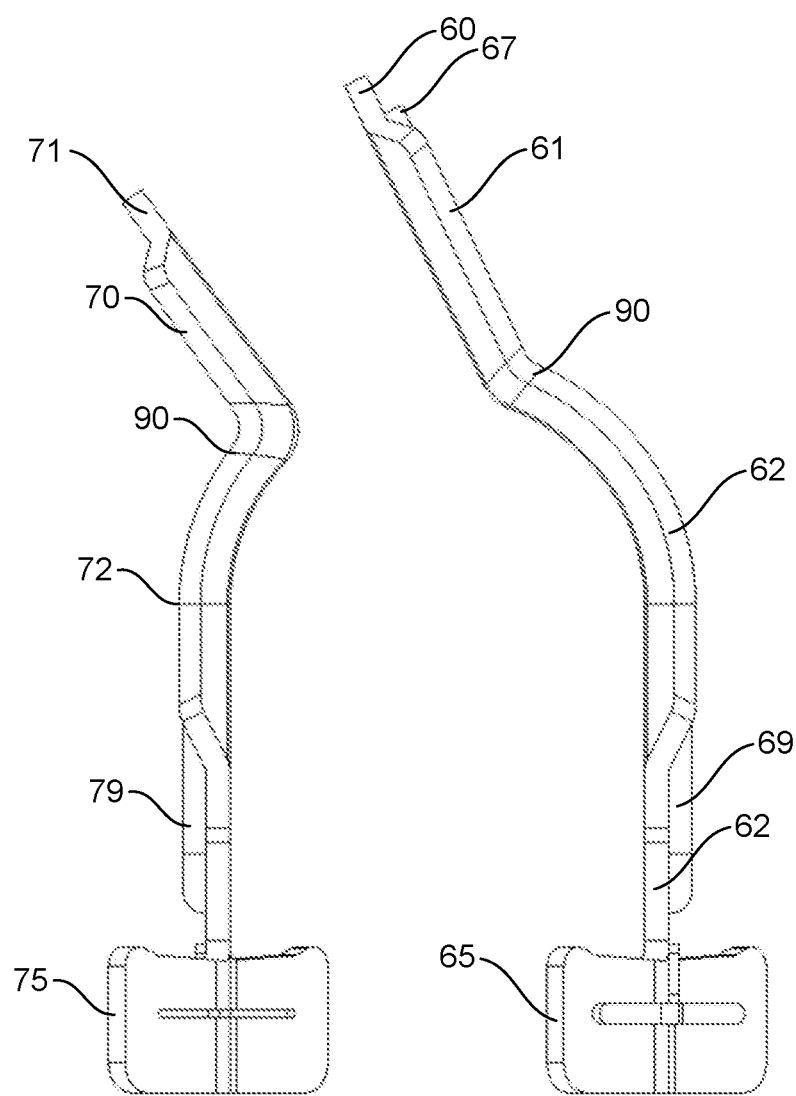
FIG. 7 is a side view of the short, angle legged strut strap with angled feet.

Also in this embodiment the strut straps 10 have angled feet at the second ends of both legs, as shown in the FIGS. 1E and 2E. In this embodiment the first leg's second end 23 has two feet 25, 26 where one foot 25 is angled away from the first leg's second end middle section 24 in one direction and the second foot 26 is angled away from the middle section 24 in an opposite direction. Likewise, the second leg's second end 33 has a pair of similar feet 35, 36 where one foot 35 is angled away from the second leg's second end middle section 34 in one direction and the second foot 36 is angled away from the second leg's second end middle section 34 in an opposite direction. In this embodiment the strut strap 10 is uniquely configured because of the angled feet. If the strut straps 10 have straight feet protruding from the middle portion, as taught in the current art and as shown in FIGS. 1D, 2D, 3D, 4D, 8C, and 9C, it is difficult to install them into U-Channel. In fact, when the feet are straight the leg's top first ends must be separated in order to install the straps into the U-Channel. This is because the strut strap actually needs to be angled or turned in order to fit into the U-Channel. It is impossible to insert the feet into the U-Channel without separating the legs one from the other. This takes additional time, is cumbersome, and there is a possibility of dropping one of the legs while installing. However, when angled, the legs can be connected at the top and, due to the angle, the feet can easily be inserted into the U-Channel. A pipe is inserted between the legs of the strut straps and when the leg tops are tightened and firmly connected the bottom portion also tightens up and solidly secures the legs into the channel and the pipe therebetween. This configuration is much easier to work with for the installer or user, it requires less time to install, and it prevents the loss or dropping of the mating leg. Overall it is generally a much easier, safer and faster system to use.

Another way to further improve the strut straps 10 is to provide a way to strengthen the strap. The current invention provides a way to strengthen the strap and in so doing allows for the use of a thinner strap that uses less material to manufacture. This is beneficial for a number of reasons. First, and most importantly, it is environmentally friendly because the material required to manufacture the straps is approximately half of what is required to manufacture a standard strut strap. In order to maintain the strength of the thicker strap though the present strap utilizes a series of original stampings during manufacturing that create a rib or ribs 39, ridges, raised portions, bumps, dimples and turned or angled edges 90. With respect to the edges, it is ideal to have the angled edges 90 on both sides of the legs turned outwardly, as is shown in all the Figs. By turning this edge to create an angle that runs along the side of the leg the strength of the leg is greatly increased. This turn can be done on one or both sides of the legs and ideally is done to both sides of the leg. Likewise, placing rib 29, 39, a ridge, an indent or bump along the central portions of the legs greatly increases the strength of the legs thus preventing bends in the material. This rib 29, 39, bump or ridge can be a single ridge down the middle of the strap as shown in FIGS. 1A, 1B, 2A, 2B, 3A, 3B, 4A and 4C for example, it can be a bump along each side of the leg, or it could be multiple bumps located in a variety of locations on the legs as shown in FIGS. 1C, 1D, 2C, 2D, 3C, 3D, 4C, and 4D. It has been found that by adding these ribs, bumps, ridges, or raised portions on the legs greatly increase their strength. Additionally, as can be seen in all the Figs. when a dimple such as a T or L or some variety thereof greatly increases the pull-out strength of the feet. It has been tested and found that the feet are at least 30% stronger when the dimples are added to the feet, as is shown in the Figures. Thus, by using the turned edges increases the leg strength and by further adding the dimple or indent to the feet increases the pull-out strength and the overall strength of the strut strap, making them as strong and solid as a standard strut strap using twice the material.

Finally, it should be noted that the flared middle section of each leg is specifically designed to fit a particular pipe size. To get this the strut straps 10 are designed and sized, such as ½ inch, ¾ inch, 1 inch, etc. The strut straps 10 are sized and then flared to fit each specific pipe dimension. Thus, the straps 10 perfectly fit around pipe and using the straps 10 the pipe is securely held in position.

In a second embodiment, shown in FIGS. 1A, 1B, 1C, 2A, 2B, 2C, 3A, 3B, 3C, 4A, 4B, 4C, 5, 6, 7, 8A, 8B, 9A, and 9B, there is a strut strap 50 having a first leg 60 with a first angled end 61, a shaped middle section 62, a second end 63 having a middle section 64 and feet 65, 66 at opposing ends of the second end 63 where each of the feet 65, 66 are angled away from the first leg second end middle section 64; next there is a second leg 70 having a first angled end 71, a shaped middle section 72 and a second end 73 having a middle section 74 and feet 75, 76 at opposing ends of the second end middle section 74 where each of the feet 75, 76 are angled away from the second end middle section 74.

This embodiment is different from the first embodiment in that the legs are no longer mirror images of each other, but rather, the legs are near mirror images of each other. That is, the legs will substantially fit when layered one on top of the other but they do not matingly fit together as in the first embodiment. This is due to the fact that the first ends are no longer straight, but are now angled and these angles will not fit perfectly together as these angled first ends must each have a slightly different angle to accommodate a pipe that is inserted between the two legs. The tops ends of the legs are angled in the same direction but the specific angle of each leg is slightly different so that the fastening means fits appropriately. This is described more fully below. The first angled ends 61, 71 of each of the legs 60, 70 meet at the top and these first angled ends of the strut straps can be connectable one to another in a variety of ways. Here there is a means to connect one to the other at the first angled ends 61, 71. One method is to have the ends permanently affixed one to another by weld, glue, adhesive or some other means. This is not very versatile and limits the usefulness of the strut straps.

Another means provides the first leg first end 61 and the second leg first end 71 where each leg end 61, 71 has a hole 67, 77 therethrough and the means to connect the one leg to the other leg is a threaded bolt 80 that is insertable through both of the holes 67, 77 and further has a nut that is fastenable to the threaded bolt 80 to secure the first leg 60 to the second leg 70. As discussed above with respect to the first embodiment, this means works but is not ideal because it requires a user to use multiple tools to connect the bolt 80. Once the bolt 80 is inserted through the first hole 67 the nut must be installed onto the bolt 80. This requires holding a first end of the bolt 80 so that it does not move or rotate while installing the nut to a second end of the bolt 80. Either the bolt first end or second end must be held while tightening the nut to the bolt. This requires the user to use both hands to secure the leg angled ends 61, 71 one to the other. This is inefficient and difficult.

A better option is clearly shown in FIGS. 8A, 8B and 8C is yet another embodiment. In this embodiment the strut strap's first leg first angled end 61 has a through hole 67. This through hole is typically not a round through hole but is a shaped through hole 68. The reason for this shape, that is usually slightly out of round, or oblong, is to accommodate the angle in the leg end to allow proper and easy bolt insertion. Without the oblong shape it is difficult for bolt 80 installation due to the angled leg. The shaped through hole 68 is necessary for proper operation. It is also recommended to have a keeper washer 89 attached to the bolt 80. This keeper washer 89 is generally a plastic washer that is installed over the bolt 80 after the bolt 80 is inserted through the shaped through hole 68 and it works to keep the bolt 80 in place. Because the shaped through hole 68 is not threaded it is possible for the bolt 80 to easily fall out of the shaped hole 68, thus creating a possibility that the bolt 80 could get dropped and lost by the user. This is prevented through use of the keeper washer 89 as it holds the bolt 80 and prevents it from falling out during installation.

In this embodiment the second leg first angled end 71 has a threaded hole 78 and the means to connect the one leg to the other leg is the bolt 80 with an end that matches the threaded hole 78 whereby the bolt 80 is insertable through the shaped through hole 68 and that is then threadably screwable into the threaded hole 78, thereby connecting the legs one to the other. This is much easier and requires less time when connecting the legs together. In fact, in testing it has been shown that it is almost ten times faster using this method rather than using the through hole with bolt and nut method.

It should be noted that the first and second leg first end angles are not typically exactly matching. This is because the angles must accommodate the screw and the pipe that is fitted between the strut straps. The angles vary depending on the strut strap size.

In this embodiment in addition to the angled first ends the strut straps 50 have angled feet at the second ends of both of the legs, as shown in FIGS. 1A, 1B, 1C, 2A, 2B, 2C, 3A, 3B and 3C amongst others. In this embodiment the first leg's second end 63 has two feet 65, 66 where one foot 65 is angled away from the first leg's second end middle section 64 in one direction and the second foot 66 is angled away from the middle section 64 in an opposite direction. Likewise, the second leg's second end 73 has two feet 75, 76 where one foot 75 is angled away from the second leg's second end middle section 74 in one direction and the second foot 76 is angled away from the second leg's second end middle section 74 in an opposite direction. In this embodiment the strut straps 50 are uniquely configured because of the angled feet. If the strut straps 50 have straight feet protruding from the middle portion, as taught in the prior art, it is difficult to install them into Unistrut or U-channel. In fact, when the feet are straight the leg's top first ends must be separated in order to install the straps into the U-Channel. This is because the strut strap actually needs to be angled or turned at sharp angles in order to fit into the U-Channel. And it is impossible to insert the leg feet into the channel without separating the legs one from the other. This takes additional time, is cumbersome, and there is a possibility of dropping one of the legs while installing. However, when angled, the legs can be connected at the top and due to the angles, the feet can easily be inserted into Unistrut or U-channel. When the pipe is in place and the leg tops are tightened and firmly connected the bottom portion also tightens up and solidly secures the legs into the channel and the pipe therebetween. This configuration is much easier to work with for the installer or user, it requires less time to install and it prevents the loss or dropping of the mating leg. Overall it is generally a much easier and safer system to use.

The angles and the preferred angles will be discussed next with reference to Table 1 and Table 2. The explanation here is to show how differing sized clamps require different angles to properly secure a pipe and to assure that the legs can properly clamp to the Uni-strut or U-channel. The first table is for a 0.5", 0.75" and 1" clamps and the information included on the table is for testing when inserting into standard strut channel which typically has a channel gap width of 0.87 inches, as shown in Table 1. All measurement for the examples are in inches. Generally speaking, the goal is to have the perfect bend, that is, one that will allow the easiest insertion of the legs in the channel gap and yet provide the strongest hold.

The table provides testing data for a wide range of angles. The tests were conducted to arrive at the optimal, perfect or almost perfect angle. For clarification in these tables, the bended width 1 is the distance from the leg end to the first bend. The center width is the distance from the first bend to a second bend and the bended width 2 is the distance from the second bend to the second end leg. The channel gap width is the width of the U-channel. The bending angle is the foot bend angle and these are preferably the same for each foot. And finally, the turning angle references the amount that the user must turn the clamp to allow insertion into the U-channel.

When considering this it is clear that if there is just a slight bend to the leg then it is difficult to get the clamp into the channel as the user will have a turning angle of almost 50°, as can be seen from the first line of the table. This is basically a standard strut strap as it exists today. Alternatively, If the leg is bent a lot then it won't hold the strap securely in the channel because there is nothing to grab onto the sides of the channel. So, the goal is to find the sweet spot between having the legs too bent and not bent enough.

TABLE 1

| Embodiment 1 (0.5", 0.75", and 1" Clamps) | | | | | |
| --- | --- | --- | --- | --- | --- |
| Center Width | Bended Width 1 | Bended With 2 | Channel Gap Width | Bending Angle | Turning Angle |
| 0.75 | 0.26 | 0.26 | 0.87 | 0.00 | 49.81 |
| 0.75 | 0.26 | 0.26 | 0.87 | 2.50 | 49.01 |
| 0.75 | 0.26 | 0.26 | 0.87 | 5.00 | 47.81 |
| 0.75 | 0.26 | 0.26 | 0.87 | 7.50 | 47.00 |
| 0.75 | 0.26 | 0.26 | 0.87 | 10.00 | 46.11 |
| 0.75 | 0.26 | 0.26 | 0.87 | 12.50 | 45.14 |
| 0.75 | 0.26 | 0.26 | 0.87 | 15.00 | 44.08 |
| 0.75 | 0.26 | 0.26 | 0.87 | 17.50 | 43.17 |
| 0.75 | 0.26 | 0.26 | 0.87 | 20.00 | 42.25 |
| 0.75 | 0.26 | 0.26 | 0.87 | 22.50 | 40.94 |
| 0.75 | 0.26 | 0.26 | 0.87 | 25.00 | 39.83 |

TABLE 1-continued

Embodiment 1 (0.5", 0.75", and 1" Clamps)

| Center Width | Bended Width 1 | Bended With 2 | Channel Gap Width | Bending Angle | Turning Angle |
|---|---|---|---|---|---|
| 0.75 | 0.26 | 0.26 | 0.87 | 27.50 | 38.70 |
| 0.75 | 0.26 | 0.26 | 0.87 | 30.00 | 37.89 |
| 0.75 | 0.26 | 0.26 | 0.87 | 32.50 | 36.69 |
| 0.75 | 0.26 | 0.26 | 0.87 | 35.00 | 35.40 |
| 0.75 | 0.26 | 0.26 | 0.87 | 37.50 | 34.17 |
| 0.75 | 0.26 | 0.26 | 0.87 | 40.00 | 33.00 |
| 0.75 | 0.26 | 0.26 | .087 | 41.80 | 32.00 |
| 0.75 | 0.26 | 0.26 | 0.87 | 42.50 | 31.72 |
| 0.75 | 0.26 | 0.26 | 0.87 | 45.00 | 30.29 |
| 0.75 | 0.26 | 0.26 | 0.87 | 47.50 | 29.38 |
| 0.75 | 0.26 | 0.26 | 0.87 | 50.00 | 27.65 |
| 0.75 | 0.26 | 0.26 | 0.87 | 52.50 | 26.28 |
| 0.75 | 0.26 | 0.26 | 0.87 | 55.00 | 24.98 |
| 0.75 | 0.26 | 0.26 | 0.87 | 57.50 | 23.75 |
| 0.75 | 0.26 | 0.26 | 0.87 | 60.00 | 22.20 |
| 0.75 | 0.26 | 0.26 | 0.87 | 62.50 | 20.64 |
| 0.75 | 0.26 | 0.26 | 0.87 | 65.00 | 19.29 |
| 0.75 | 0.26 | 0.26 | 0.87 | 67.50 | 17.50 |
| 0.75 | 0.26 | 0.26 | 0.87 | 70.00 | 16.03 |
| 0.75 | 0.26 | 0.26 | 0.87 | 72.50 | 14.32 |
| 0.75 | 0.26 | 0.26 | 0.87 | 75.00 | 12.65 |
| 0.75 | 0.26 | 0.26 | 0.87 | 77.50 | 10.74 |
| 0.75 | 0.26 | 0.26 | 0.87 | 80.00 | 9.16 |
| 0.75 | 0.26 | 0.26 | 0.87 | 82.50 | 7.19 |
| 0.75 | 0.26 | 0.26 | 0.87 | 85.00 | 5.03 |
| 0.75 | 0.26 | 0.26 | 0.87 | 87.50 | 5.25 |
| 0.75 | 0.26 | 0.26 | 0.87 | 90.00 | 5.12 |

Table 1 is the shorter leg embodiment where the clamp is sized at 0.5 inches to 1 inch. This means that the 0.5-inch clamp is configured to hold a ½-inch piece of pipe, 0.75-inch clamp is configured to hold a 0.75-inch piece of pipe, and 1-inch clamp is configured to hold a 1-inch piece of pipe. BW1 is the bended width, or the distance from one end of the first foot to the first bend. The Center Width, or CW, is the distance from the first bend to the second bend, and BW2 is the distance from the second bend to the second end. The channel gap width refers to the distance from side to side of the inside of the Unistrut channel. The bending angle as referenced in Column E is the degree of angle at the bend. Finally, the turning angle in column F is the degree of rotation required to insert the clamp into the U-channel. As is shown, if there is absolutely no bent angle then the turning angle required for insertion is almost 50°. At this angle it is difficult or impractical to insert without taking the main legs apart. This is the case in the current art and what is now being used in the industry. As can be seen from the table though, the greater the bending angle the less the turning angle. Testing shows the optimal angle for the bending angle is between 37.5 and 45 and is ideally set at or approximately at 41.80. The next best angle range according to Table 1 is from 32.5 to 50. The bending angle can be between 30 to 52.5 but it becomes too loose as the bending angle increases and becomes more difficult to fit in the channel gap without running the clamp more. In other words, it is possible to extend beyond this range but to do so would not be optimal as it would either be too difficult to insert the legs into the channel or it would be easy to insert the legs but the legs would not be securely held in place in the channel.

TABLE 2

Embodiment 4 (1.5", 1.75", 2" Clamps)

| Center Width | Bended Width 1 | Bended With 2 | Channel Gap Width | Bending Angle | Turning Angle |
|---|---|---|---|---|---|
| 0.75 | 0.26 | 0.26 | 0.87 | 0.00 | 49.86 |
| 0.75 | 0.26 | 0.26 | 0.87 | 2.50 | 49.14 |
| 0.75 | 0.26 | 0.26 | 0.87 | 5.00 | 48.10 |
| 0.75 | 0.26 | 0.26 | 0.87 | 7.50 | 47.16 |
| 0.75 | 0.26 | 0.26 | 0.87 | 10.00 | 46.22 |
| 0.75 | 0.26 | 0.26 | 0.87 | 12.50 | 45.39 |
| 0.75 | 0.26 | 0.26 | 0.87 | 15.00 | 44.41 |
| 0.75 | 0.26 | 0.26 | 0.87 | 17.50 | 43.26 |
| 0.75 | 0.26 | 0.26 | 0.87 | 20.00 | 42.24 |
| 0.75 | 0.26 | 0.26 | 0.87 | 22.50 | 41.42 |
| 0.75 | 0.26 | 0.26 | 0.87 | 25.00 | 40.10 |
| 0.75 | 0.26 | 0.26 | 0.87 | 27.50 | 38.99 |
| 0.75 | 0.26 | 0.26 | 0.87 | 30.00 | 37.98 |
| 0.75 | 0.26 | 0.26 | 0.87 | 32.50 | 36.72 |
| 0.75 | 0.26 | 0.26 | 0.87 | 35.00 | 35.65 |
| 0.75 | 0.26 | 0.26 | 0.87 | 37.50 | 34.50 |
| 0.75 | 0.26 | 0.26 | 0.87 | 40.00 | 33.14 |
| 0.75 | 0.26 | 0.26 | 0.87 | 42.48 | 32.00 |
| 0.75 | 0.26 | 0.26 | 0.87 | 42.50 | 31.99 |
| 0.75 | 0.26 | 0.26 | 0.87 | 45.00 | 30.69 |
| 0.75 | 0.26 | 0.26 | 0.87 | 47.50 | 29.29 |
| 0.75 | 0.26 | 0.26 | 0.87 | 50.00 | 28.04 |
| 0.75 | 0.26 | 0.26 | 0.87 | 52.50 | 26.87 |
| 0.75 | 0.26 | 0.26 | 0.87 | 55.00 | 25.21 |
| 0.75 | 0.26 | 0.26 | 0.87 | 57.50 | 23.97 |
| 0.75 | 0.26 | 0.26 | 0.87 | 60.00 | 22.30 |
| 0.75 | 0.26 | 0.26 | 0.87 | 62.50 | 20.99 |
| 0.75 | 0.26 | 0.26 | 0.87 | 65.00 | 19.67 |
| 0.75 | 0.26 | 0.26 | 0.87 | 67.50 | 17.87 |
| 0.75 | 0.26 | 0.26 | 0.87 | 70.00 | 16.25 |
| 0.75 | 0.26 | 0.26 | 0.87 | 72.50 | 14.49 |
| 0.75 | 0.26 | 0.26 | 0.87 | 75.00 | 12.88 |
| 0.75 | 0.26 | 0.26 | 0.87 | 77.50 | 11.00 |
| 0.75 | 0.26 | 0.26 | 0.87 | 80.00 | 9.39 |
| 0.75 | 0.26 | 0.26 | 0.87 | 82.50 | 7.39 |
| 0.75 | 0.26 | 0.26 | 0.87 | 85.00 | 6.68 |
| 0.75 | 0.26 | 0.26 | 0.87 | 87.50 | 6.62 |
| 0.75 | 0.26 | 0.26 | 0.87 | 90.00 | 6.41 |

When reference is made to Table 2 for the 1.5, 1.75, and 2 inch clamps respectively a similar result is seen. Here, the optimal turning angle is 32.00 with 42.48 being the optimal bending angle. The other non-optimal angles are the same as Table 1, that is, the optimal angle for the bending angle is between 37.5 and 45 and is ideally set at or approximately at 42.48. The next best angle range is from 32.5 to 50. A next useable range is from 25 to 57.5. It is possible to extend beyond this range but to do so would not be optimal as it would either be too difficult to insert the legs into the channel or it would be easy to insert the legs but the legs would not be securely held in place in the channel. Thus, the ranges listed are the preferred angle ranges for peak operability for the 1.5", 1.75", and 2" inch clamps.

Another strut strap 50 improvement taught in this embodiment is to provide a thinner strap that uses less material to manufacture and that is as strong as a traditional strut strap. This is beneficial for a number of reasons. First, and most importantly, it is environmentally friendly because the material required to manufacture the straps is approximately half of what is required to manufacture a standard strut strap. In order to maintain the strength of the thinner strap the present invention utilizes a series of original stampings that create ridges, bumps, dimples and turned or angled edges. With respect to the edges 90, it is ideal to have the edges 90 on both sides of the legs turned outwardly, as is shown in the Figs. By turning this edge 90 to create an angle that runs along the side of the leg the strength of the leg is greatly increased. Likewise, placing a rib 69, 79, ridge, an indent or bump along the central portions of the legs greatly increases the strength of the legs thus preventing bends in the material. It has been found that by adding these ribs, bumps or raises on the legs greatly increase their strength. Additionally, as can be seen in all Figs., a dimple 92 such as a T or L or some variety thereof is added to the feet. This dimple greatly increases the pull-out strength of the feet. It has been tested and found that the feet are approximately 30% stronger when the dimples 92 are added to the upper foot location, as is shown in the Figures. Thus, by using the turned edge 90, the ribs, bumps or stampings and the dimples or indents increases the pull-out strength and the overall strength of the strut strap, making it as strong and solid as a standard strut strap while using half the material.

Finally, it should be noted that the shaped middle section of each leg is specifically designed to fit a particular pipe size. To get this the strut straps are designed and sized, such as ½ inch, ¾ inch, 1 inch, or any size to fit a matching pipe. The strut strap 50 is sized and then flared and shaped to fit each specific pipe dimension.

Although the invention has been described with reference to the preferred embodiments illustrated in the attached drawing figures it is noted that equivalents may be employed and substitutions made herein without departing from the scope of the invention as recited in the claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Having thus described the various embodiments of the invention, what is claimed as new and desired to be protected by letters patent includes the following.

The invention claimed is:

1. A strut strap comprising:
    a first leg having:
        a first end;
        a curved middle section;
        a second end having a middle section and feet at opposing ends where each of said feet define an obtuse angle that extends away from a plane where said plane defines a length of said middle section;
    a second leg having:
        a first end;
        a curved middle section; and
        a second end having a middle section and feet at opposing ends where each of said feet define an obtuse angle that extends away from a plane where said plane defines a length of said middle section.

2. The strut strap of claim 1, wherein each of said first leg and said second leg are connectable to one another at said first ends.

3. The strut strap of claim 2, wherein said first end of said first leg and said first end of said second leg each have a hole therethrough and where said first and second legs are connectable with a threaded bolt that is insertable through both of said holes and further has a nut that is fastenable to said threaded bolt to secure said first leg to said second leg.

4. The strut strap of claim 2, wherein said first end of said first leg has a through hole and said first end of said second leg has a threaded hole and are connectable one to the other with a bolt with an end that matches said threaded hole that is insertable through said through hole and that is then screwable into said threaded hole.

5. The strut strap of claim 2, wherein said first end of said first leg and said first end of said second leg are permanently affixed one to the other.

6. The strut strap of claim 1, wherein:
said feet of said first leg at said opposing ends is a first and second foot at respective end of said middle section of said second end of said first leg where said first foot of said first leg is angled away from said middle section of said second end of said first leg in one direction and said second foot of said first leg is angled away from said middle section of said second end of said first leg in an opposite direction; and
wherein said feet of said second leg at said opposing ends is a first and second foot at respective end of said middle section of said second end of said second leg where said first foot of said second leg is angled away from said middle section of the second end of said second leg in one direction and said second foot is angled away from said middle section of the second end of said second leg in an opposite direction.

7. The strut strap of claim 1 wherein said first and second legs have at least one angled edge along an outside of said curved middle section.

8. The strut strap of claim 1 wherein said first and second legs have a least one rib on a surface of said legs.

9. The strut strap of claim 8, wherein said at least one rib runs from approximately said first end to approximately said second end.

10. The strut strap of claim 9 further comprising at least one dimple in each of said feet.

11. The strut strap of claim 1 where said curved middle sections are configured to matingly fit around a pipe.

12. A strut strap comprising:
a first leg having:
a first angled end;
a curved middle section;
a second end having a middle section and feet at opposing ends where each of said feet define an obtuse angle that extends away from a plane where said plane defines a length of said middle section;
a second leg having:
a first angled end;
a curved middle section; and
a second end having a middle section and feet at opposing ends where each of said feet define an obtuse angle that extends away from a plane where said plane defines a length of said middle section.

13. The strut strap of claim 12 wherein each of said first leg and said second leg are connectable to one another at said first ends.

14. The strut strap of claim 13 wherein said first end of said first leg and said first end of said second leg each have a hole therethrough and are connected with a threaded bolt that is insertable through both of said holes and further has a nut that is fastenable to said threaded bolt to secure said first leg to said second leg.

15. The strut strap of claim 13 wherein said first end of said first leg has a through hole and said first end of said second leg has a threaded hole and where said legs are connected with a bolt with an end that matches said threaded hole that is insertable through said through hole and that is then screwable into said threaded hole.

16. The strut strap of claim 13 wherein said first end of said first leg and said first end of said second leg are permanently affixed one to the other.

17. The strut strap of claim 12 wherein:
said feet of said second end of said first leg has a first and second foot at respective end of said curved middle section of said second end of said first leg where said first foot of said first leg is angled away from said curved middle section of said second end of said first leg in one direction and said second foot of said first leg is angled away from curved middle section of said second end of said first leg in an opposite direction; and
wherein said feet of said second end of said second leg has a first and second foot at respective end of said curved middle section of said second end of said second leg where said first foot of said second leg is angled away from said curved middle section of said second end of said second leg in one direction and said second foot of said second leg is angled away from said curved middle section of said second end of said second leg in an opposite direction.

18. The strut strap of claim 12 wherein each of said curved middle section of said first leg and said curved middle section of said second leg has at least one angled edge and at least one indent.

19. The strut strap of claim 18 has more than one indent wherein at least one indent runs from approximately said first end to approximately said second end of said curved middle sections of said first leg and said second legs and said feet of said first and second leg each have at least one indent.

20. The strut strap of claim 12 where said curved middle sections of said first leg and said second leg configured to be defined by a pipe size and to fit around a matching pipe.

\* \* \* \* \*